(12) United States Patent
Deng et al.

(10) Patent No.: US 12,323,286 B2
(45) Date of Patent: *Jun. 3, 2025

(54) METHOD AND APPARATUS FOR INITIAL CELL SEARCH AND SELECTION

(71) Applicant: InterDigital Patent Holdings, Inc., Wilmington, DE (US)

(72) Inventors: Tao Deng, Roslyn, NY (US); Steven Ferrante, Doylestown, PA (US); Ravikumar V. Pragada, Warrington, PA (US); Yugeswar Deenoo, Chalfont, PA (US); Daniel R. Cohen, Setauket, NY (US); Janet A. Stern-Berkowitz, Little Neck, NY (US); Moon-il Lee, Melville, NY (US); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,663

(22) Filed: Dec. 19, 2023

(65) Prior Publication Data

US 2024/0146598 A1    May 2, 2024

Related U.S. Application Data

(63) Continuation of application No. 17/746,680, filed on May 17, 2022, now Pat. No. 11,848,811, which is a
(Continued)

(51) Int. Cl.
*H04L 27/26* (2006.01)
*H04B 7/06* (2006.01)
(Continued)

(52) U.S. Cl.
CPC ....... *H04L 27/2673* (2013.01); *H04B 7/0695* (2013.01); *H04B 7/088* (2013.01);
(Continued)

(58) Field of Classification Search
CPC ............ H04L 27/2673; H04L 27/2766; H04B 7/0695; H04B 7/088; H04B 7/0617; H04W 48/12; H04W 48/16; H04W 56/001
See application file for complete search history.

(56) References Cited

U.S. PATENT DOCUMENTS

| 2015/0004918 A1 | 1/2015 | Wang et al. |
| 2015/0326359 A1 | 11/2015 | Subramanian et al. |

(Continued)

FOREIGN PATENT DOCUMENTS

| WO | 2014/124164 | 8/2014 |
| WO | 2014/124237 | 8/2014 |
| WO | 2015/080646 | 6/2015 |

OTHER PUBLICATIONS

Abu-Surra et al., "PHY Simulations and Methodology," IEEE 802.11-10/0431r3 (May 2010).
(Continued)

*Primary Examiner* — Robert C Scheibel
(74) *Attorney, Agent, or Firm* — Volpe Koenig

(57) ABSTRACT

A method performed by a wireless transmit/receive unit (WTRU) may include receiving a configuration message including timing information for monitoring at least a subset of a plurality of beams to receive a set of synchronization signals and receiving the set of synchronization signals based on the timing information. The received set of synchronization signals include a primary synchronization signal and a secondary synchronization signal. The method may include receiving a reference signal along with a
(Continued)

physical broadcast channel (PBCH) transmission. The reference signal comprises a sequence that is derived from an index associated with one of the at least the subset of beams and associated with the received set of synchronization signals. The method may include transmitting a random access channel (RACH) transmission. The RACH transmission includes a preamble sequence corresponding to the one of the subset of the plurality of beams.

20 Claims, 22 Drawing Sheets

Related U.S. Application Data continuation of application No. 15/735,327, filed as application No. PCT/US2016/039321 on Jun. 24, 2016, now Pat. No. 11,336,500.

(60) Provisional application No. 62/307,005, filed on Mar. 11, 2016, provisional application No. 62/184,580, filed on Jun. 25, 2015.

(51) Int. Cl.
    *H04B 7/08*         (2006.01)
    *H04W 48/12*      (2009.01)
    *H04W 48/16*      (2009.01)
    *H04W 56/00*      (2009.01)

(52) U.S. Cl.
    CPC ........... *H04W 48/12* (2013.01); *H04W 48/16* (2013.01); *H04W 56/001* (2013.01); *H04B 7/0617* (2013.01); *H04L 27/2666* (2013.01)

(56) References Cited

U.S. PATENT DOCUMENTS

| | | | |
|---|---|---|---|
| 2015/0341908 A1 | 11/2015 | Wang et al. | |
| 2015/0349863 A1 | 12/2015 | El Ayach et al. | |
| 2015/0358129 A1* | 12/2015 | Ryu .................. | H04B 7/088 455/438 |
| 2015/0382268 A1* | 12/2015 | Hampel ............ | H04W 36/0072 455/436 |
| 2016/0021549 A1 | 1/2016 | Subramanian et al. | |
| 2016/0308637 A1* | 10/2016 | Frenne .............. | H04W 56/0015 |
| 2016/0323075 A1* | 11/2016 | Jeong ................ | H04B 7/024 |
| 2017/0111886 A1 | 4/2017 | Kim et al. | |
| 2017/0135029 A1 | 5/2017 | Chendamarai Kannan et al. | |
| 2018/0138590 A1 | 5/2018 | Uchida et al. | |
| 2018/0343043 A1 | 11/2018 | Hakola et al. | |
| 2019/0007897 A1 | 1/2019 | Ng et al. | |
| 2019/0013851 A1 | 1/2019 | Su et al. | |
| 2019/0045377 A1* | 2/2019 | Kakishima ............ | H04W 16/28 |

OTHER PUBLICATIONS

Agyapong, et al., "METIS Simulation Guideline, METIS Deliverable D6.1 Simulation Guidelines", Version 1, https://www.metis2020.com/wp-content/uploads/deliverables/METIS_D6.1_v1.pdf (Oct. 2010).
AWE Communications, "WinProp software suite," Available at: https://altairhyperworks.com/product/FEKO/WinProp-Propagation-Modeling (Last Visited: Mar. 2018).
Azar et al., "28 GHz Propagation Measurements for Outdoor Cellular Communications Using Steerable Beam Antennas in New York City," IEEE ICC 2013, pp. 5143-5147, (Jun. 2013).
Barati et al., "Directional Cell Search for Millimeter Wave Cellular Systems," Proc. IEEE Signal Processing Advances in Wireless Communications (SPAWC), Toronto, Canada, pp. 120-124, (Jun. 2014).
Ferrante et al., "mmWave UE Antenna Configuration Study," 2015 IEEE 81st Vehicular Technology Conference (VTC Spring), Glasgow, pp. 1-6 (2015).
Ghosh et al., "Millimeter Wave Enhanced Local Area Systems: A High Data Rate Approach for Future Wireless Networks", IEEE Journal on Selected Areas in Communications, vol. 32, No. 6, pp. 1152-1163, (Jun. 2014).
Huawei, "AAS BS applications and deployment scenarios," 3GPP TSG-RAN WG4 Meeting #68bis, R4-134885, Riga, Latvia (Nov. 7-11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
International Telecommunication Union, "Recommendation ITU-R P.526-13—Propagation by Diffraction," P Series, Radiowave Propagation (Nov. 2013).
Khan et al., "An introduction to Millimeter-Wave Mobile Broadband Systems", IEEE Communication Magazine, vol. 49, No. 6, pp. 101-107 (Jun. 2011).
Popovski et al., "METIS Deliverable D2.1 Requirment Analysis and Design Approaches for 5G Air Interface", Version 1, Available at: https://www.metis2020.com/wp-content/uploads/deliverables/METIS_D2.1_v1.pdf (Aug. 2013).
Rappaport et al., "Millimeter Wave Mobile Communications for 5G Cellular: It Will Work!," IEEE Access, vol. 1, pp. 335-349, (2013).
Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.4.0 (Mar. 2015).
Third Generation Partnership Project, "Technical Specification Group Radio Access Network; Evolved Universal Terrestrial Radio Access (E-UTRA); User Equipment (UE) procedures in idle mode (Release 13)," 3GPP TS 36.304 V13.0.0 (Dec. 2015).
Third Generation Partnership Project, "Technical Specification Group Radio Access Network; Evolved Universal Terrestrial Radio Access (E-UTRA); User Equipment (UE) procedures in idle mode (Release 13)," 3GPP TS 36.304 V13.1.0 (Mar. 2016).
Third Generation Partnership Project, "Technical Specification Group Radio Access Network; Evolved Universal Terrestrial Radio Access (E-UTRA); Physical channels and modulation (Release 12)," 3GPP TS 36.211 V12.5.0 (Mar. 2015).
Third Generation Partnership Project, "Technical Specification Group Radio Access Network; Evolved Universal Terrestrial Radio Access (E-UTRA); Physical channels and modulation (Release 13)," 3GPP TS 36.211 V13.0.0 (Dec. 2015).
Third Generation Partnership Project, "Technical Specification Group Radio Access Network; Evolved Universal Terrestrial Radio Access (E-UTRA); Physical channels and modulation (Release 13)," 3GPP TS 36.211 V13.1.0 (Mar. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.5.0 (Mar. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.2.0 (Dec. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).
Third Generation Partnership Project, "Technical Specification Group Radio Access Network; Evolved Universal Terrestrial Radio Access (E-UTRA); Physical layer procedures (Release 12)," 3GPP TS 36.213 V12.5.0 (Mar. 2015).
Third Generation Partnership Project, "Technical Specification Group Radio Access Network; Evolved Universal Terrestrial Radio Access (E-UTRA); Physical layer procedures (Release 13)," 3GPP TS 36.213 V13.0.1 (Jan. 2016).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 13)," 3GPP TS 36.213 V13.1.1 (Mar. 2016).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.5.0 (Mar. 2015).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.0.0 (Dec. 2015).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.5.0 (Mar. 2015).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.0.0 (Dec. 2015).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.1.0 (Mar. 2016).

Third Generation Partnership Project, "Technical Specification Group Radio Access Network; Study of Radio Frequency (RF) and Electromagnetic Compatibility (EMC) requirements for Active Antenna Array System (AAS) base station (Release 12)," 3GPP TR 37.840 V12.1.0 (Dec. 2013).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.4.0 (Mar. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.8.0 (Mar. 2016).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.1.0 (Mar. 2016).

Tsang et al., Detecting Human Blockage and Device Movement in mmWave Communication System, 2011 IEEE Global Telecommunications Conference—GLOBECOM 2011, Houston, TX, USA, 2011, pp. 1-6 (Dec. 2011).

Yin et al., "High-Throughput Beamforming Receiver for Millimeter Wave Mobile Communication", in IEEE Global Communications Conference (GLOBECOM), (Dec. 2013).

Zhao et al., "28 GHz Millimeter Wave Cellular Communication Measurement for Reflection and Penetration Loss in and around Building in New York City", IEEE ICC 2013, pp. 561-567 (Jun. 2013).

* cited by examiner

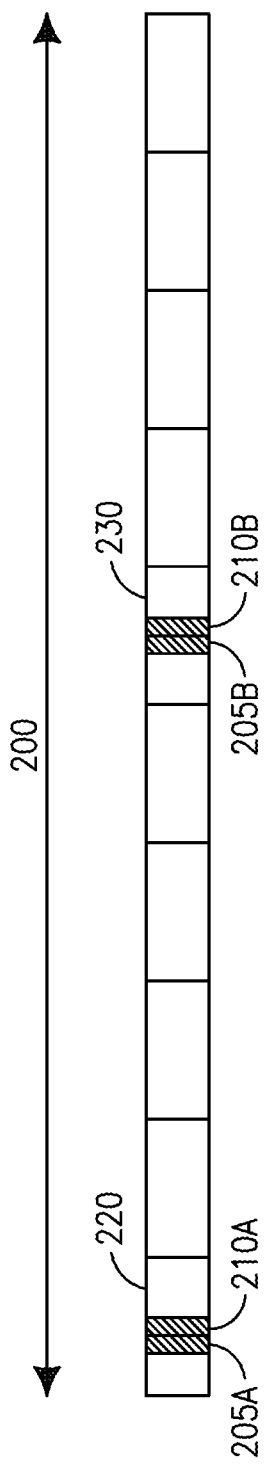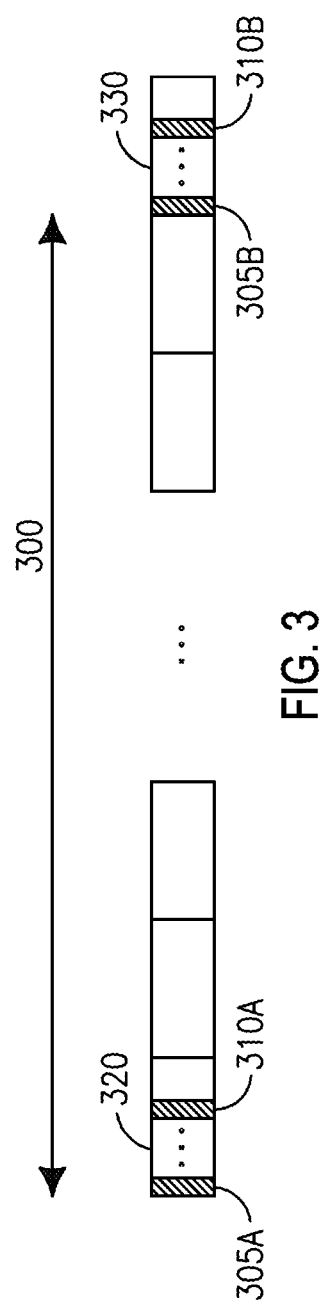

METHOD AND APPARATUS FOR INITIAL CELL SEARCH AND SELECTION

CROSS REFERENCE TO RELATED APPLICATIONS

This application is a continuation of U.S. patent application Ser. No. 17/746,680 filed on May 17, 2022, which is a continuation of U.S. patent application Ser. No. 15/735,327 filed on Dec. 11, 2017, which issued as U.S. Pat. No. 11,336,500 on May 17, 2022, which is the U.S. National Stage, under 35 U.S.C. § 371, of International Application No. PCT/US2016/039321 filed Jun. 24, 2016, which claims the benefit of U.S. Provisional Application No. 62/184,580, filed Jun. 25, 2015, and U.S. Provisional Application No. 62/307,005, which was filed on Mar. 11, 2016, the contents of which are hereby incorporated by reference herein.

BACKGROUND

The next generation of cellular communication systems, commonly referred to as 5G, will require higher throughput (e.g., up to 10 Gbps or better over the air) and lower latency (e.g., 1 ms) than previous generations. In order to meet these requirements, additional bandwidth may be needed. One band that may be available for use by 5G cellular communication systems that is currently not being used for such purposes is the millimeter wave (mmW) band, which includes frequencies at or above 6 GHz. Use of such bands for cellular systems may allow for much higher data rates than are currently possible and may allow for use of a smaller transmit time interval (TTI), which may reduce latency.

SUMMARY

Methods and apparatus for initial cell search and selection using beamforming are described. An apparatus is configured with multiple receive beams and includes an antenna and a processor. The processor is operatively coupled to the antenna and sweeps a respective one of the multiple receive beams during each of multiple synchronization sub-frames, using a pre-defined sweep time and dwell period, to detect a synchronization signal. The processor also obtains symbol timing information and a synchronization signal index from the detected synchronization signal. The obtained synchronization signal index corresponds to a synchronization signal index of the set. The processor decodes a first broadcast channel using the obtained symbol timing information, the obtained synchronization signal index and a predefined or blind-coded symbol distance between the detected synchronization signal and the first broadcast channel. The processor decodes a second broadcast channel using information obtained from decoding the first broadcast channel.

BRIEF DESCRIPTION OF THE DRAWINGS

A more detailed understanding may be had from the following description, given by way of example in conjunction with the accompanying drawings wherein:

FIG. 2 is a diagram of an example frequency division duplex (FDD) frame showing example primary synchronization signal (PSS) and secondary synchronization signal (SSS) locations;

FIG. 3 is a diagram of another example mmW frame structure;

DETAILED DESCRIPTION

Figure 1A:
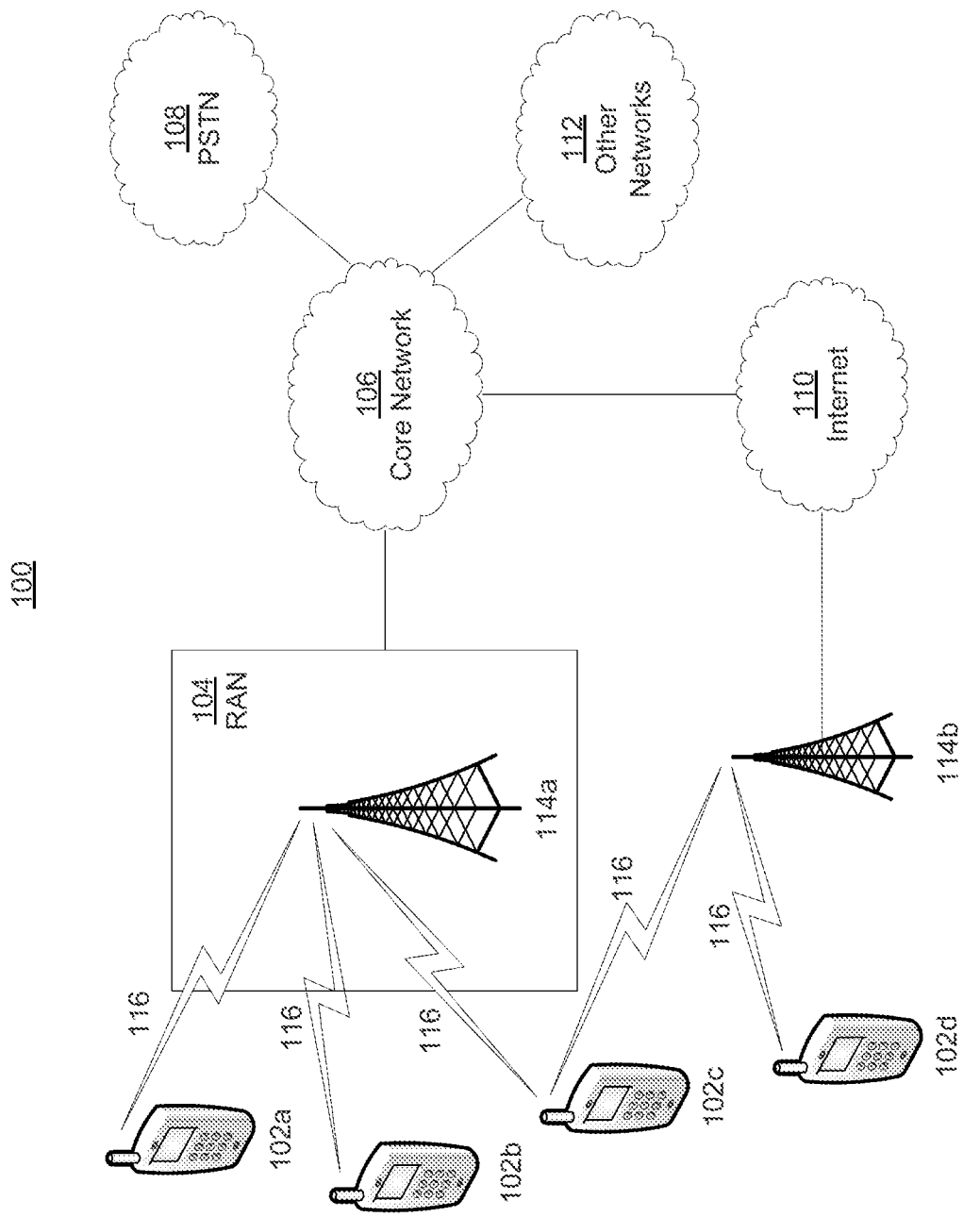
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth.

For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the other networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple-output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
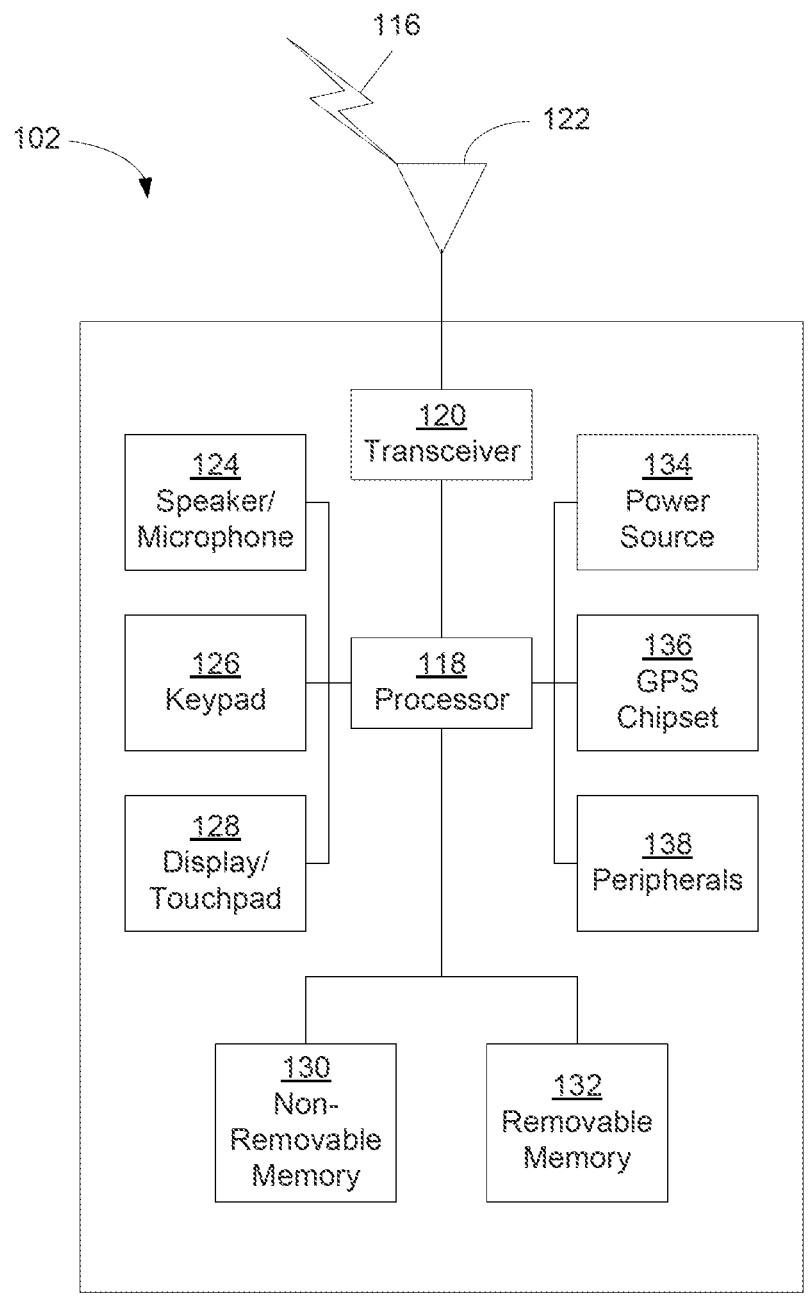
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
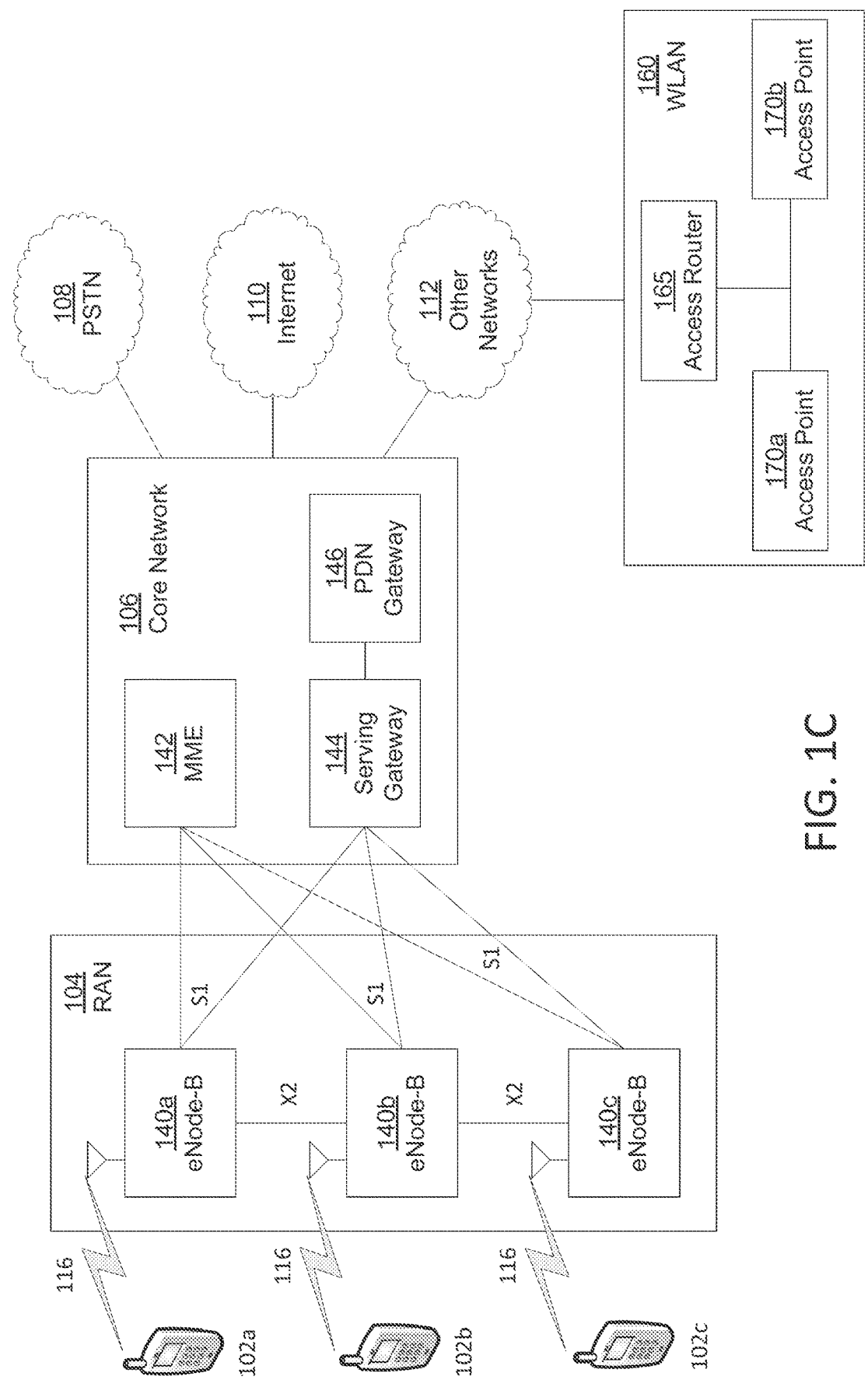
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170*a*, 170*b*. The communication between access router 165 and APs 170*a*, 170*b* may be via wired Ethernet (IEEE 802.3 standards), or any type of wireless communication protocol. AP 170*a* is in wireless communication over an air interface with WTRU 102*d*.

Above-6 GHz frequencies have traditionally not been used for cellular systems due to propagation characteristics that have been presumed to be unfavorable for wireless communication in outdoor environments. Higher frequency transmissions generally tend to experience higher free space path loss. Rainfall, atmospheric gasses (e.g. oxygen), and foliage may add further attenuation compared to sub-6 GHz frequencies. In addition, penetration and diffraction attenuation may become more severe at mmW frequencies as opposed to sub-6 GHz frequencies.

The above-described propagation characteristics of above-6 GHz frequencies may result in significant Non Line-Of-Sight (NLOS) propagation path loss. For example, at mmW frequencies, NLOS path loss may be more than 20 dB higher than Line-Of-Sight (LOS) path loss and may severely limit the coverage of the mmW transmission.

Recent channel measurements have demonstrated feasibility of outdoor mmW cellular coverage with the help of beamforming techniques. The measurement data shows that the beamforming gain may not only be able to provide required coverage for cellular control signaling in NLOS conditions but may also boost the link capacity to achieve higher data throughput in LOS conditions. Antennas that implement such beamforming techniques may need to provide high gain and, therefore, be highly directional, which may require use of large antenna arrays that are electronically steerable at both the transmitter and receiver.

Given the propagation characteristics of above-6 GHz frequency channels and the very high data throughput requirements of 5G cellular systems, 5G systems may be optimally designed to enable a beamformed access link with beamforming on all physical layer signals and channels. The physical layer signals and channels may apply different beamforming techniques and may also have their own specific beamforming configuration (e.g., beamwidth and beamforming gain). Further, above 6-GHz system designs may incorporate beamforming aspects into all system procedures. An aligned beam pair at above 6-GHz frequencies may provide an additional degree of freedom in the angular domain compared with conventional cellular systems. The system design may take into account the beamforming and beam pairing features specific to each physical layer signal and channel and incorporate the corresponding spatial control and maneuvering into all system procedures, including, for example, cell search, random access, and control channel decoding.

Beamforming techniques may include digital, analog or hybrid beamforming. With digital beamforming, each antenna element may have a dedicated radio frequency (RF) chain, each of which may include RF processing elements and analog-to-digital/digital-to-analog converters (ADC/DAC). The signal processed by each antenna element may be controlled independently in phase and amplitude to optimize the channel capacity. The number of RF chains may be equal to the number of antenna elements. While offering very high performance, digital beamforming techniques may impose a high cost and complexity in implementation and cause high energy consumption in operation.

Analog beamforming may require only one RF chain for a number of antenna elements that constitute a Phase Antenna Array (PAA). Each antenna element may have a phase shifter, which may be used to set a phase-only weight for beamforming and steering of the antenna pattern of the PAA. The number of applied RF chains may be significantly lower than the number of antenna elements, and the number of RF chains may be the same as, or lower than, the number of PAAs. For example, multiple PAAs may be connected to a single RF chain, and each PAA may have an antenna pattern of specific azimuth and elevation coverage. The RF chain may be switched to one PAA at a time and thus a single RF chain with multiple PAAs may provide a broad coverage by using one beam at a different direction at a different time instance.

Hybrid beamforming may combine digital precoding and analog beamforming. The analog beamforming may be performed over antenna elements of a PAA connected to one RF chain. The digital precoding may be applied to the baseband signal for each RF chain and its associated PAA. The configuration of the hybrid beamforming may include a number of data streams, a number of RF chains, a number of a PAAs and a number of antenna elements. One PAA connected to an RF chain may be represented by an antenna port uniquely identified by a beamformed reference signal specific to the antenna port.

The high implementation cost and energy consumption of digital beamforming techniques for above-6 GHz systems may introduce specific implementation considerations for an above-6 GHz 5G wireless system. For example, the above-6 GHz 5G beamforming technique may be based on hybrid beamforming with a high degree of analog beamforming such that, for example, the number of RF chains may be significantly lower than the number of antenna elements. Implications of the analog beamforming technique may impact all system procedures, including initial cell search, and may result in new procedural behaviors and events. Directional transmission may offer a high degree of flexibility to the eNB to customize the transmission both in the time and spatial domains to reduce signal overhead and energy consumption.

Initial cell search is a procedure through which a WTRU may attempt to gain initial access to a network by acquiring time and frequency synchronization with a cell and detecting the Cell ID of the cell. The procedure may be facilitated by one or more synchronization signals, which may be transmitted by all cells in the network. The synchronization signals may include, for example a primary synchronization signal (PSS) and a secondary synchronization signal (SSS).

FIG. 2 is a diagram of an example Long Term Evolution (LTE) frequency division duplex (FDD) frame 200 showing example PSS and SSS locations. As illustrated in FIG. 2, the PSS 205 and SSS 210 are transmitted in the 0th subframe 220 and the 5th subframe 230 of every radio frame 200 and may be used for time and frequency synchronization during initialization. The frame 200 may be a 10 ms frame and may be divided into 10 subframes of 1 ms each.

The synchronization signals may be based on Zadoff-Chu (ZC) sequences and may be used by the WTRU to find an appropriate cell within the network, determine its downlink frame timing, and identify its physical layer identity. More specifically, as part of the system acquisition process, a WTRU may synchronize sequentially to the OFDM symbol, slot, subframe, half-frame, and radio frame based on the synchronization signals. In LTE, for example, the PSS may be used to obtain slot, subframe and half-frame boundary synchronization. The PSS may also provide physical layer (PHY) cell identity (PCI) within the cell identity group. In LTE, for example, there are 504 different PCIs, which are divided into 168 groups, each associated with three different identities that are mapped to three possible PSS sequences. This grouping may reduce the complexity of the overall cell search procedure. The SSS may be used to obtain the radio frame boundary and may also enable the WTRU to determine the cell identity group, which may range from 0 to 167. Following a successful synchronization and PCI acquisition, a WTRU may, for example, decode the physical broadcast channel (PBCH) with the help of a cell-specific reference signal (CRS) and acquire master information block (MIB) information regarding system bandwidth, system frame number (SFN) and physical hybrid automatic repeat request (HARQ) indicator channel (PHICH) configuration.

The initial search procedure described above assumes a fixed beam pattern with cell-wide coverage. For example, the LTE synchronization signals and PBCH described above are transmitted continuously according to standardized periodicity. However, for mmW networks employing dual-end highly directional links, using analog or hybrid beamforming techniques to minimize the number of RF chains utilized, such coverage may not be practical. Embodiments described herein provide methods and apparatus for initial cell search and selection where beamforming may employed at both the network and WTRU.

The initial search procedure described above also assumes use of an omnidirectional antenna pattern, which allows for WTRU rotational motion to be largely ignored. However, for mmW systems, support for highly directional links may require the antennas to be electronically steerable, and mmW systems may also require a beam pairing to be established. Both of these aspects of mmW systems may make them more sensitive to WTRU rotational motion. For example, a beam pair tested at the beginning of an exhaustive search procedure may not have the same quality at the end of the search when the beam pairing decision is made. Embodiments described herein provide methods of initial cell search and selection where beamforming may be applied at both the network and the WTRU, which take into account rotational motion of the WTRU.

At the network end, methods and apparatus are described that may enable a network to provide the synchronization signals and PBCH in a manner in which mmW WTRUs (also referred to herein simply as WTRUs) may receive them. In embodiments, in order to reach users at cell edge and service all users in high density cells, the synchronization and broadcast channels may be transmitted on multiple beams, which may not be transmitted continuously in time. In embodiments, the PSS and SSS may be transmitted on different beams. Similarly, the PSS/SSS and PBCH may be transmitted on different beams.

Embodiments described herein provide for mmW synchronization signal design and methods of mapping one or more synchronization signal types (e.g., PSS and SSS) to physical resources. The one or more synchronization signal types may provide one or more pieces of timing information, including, for example, symbol timing, TTI timing, sub-frame timing and frame timing.

In embodiments, a mmW system may use a sub-frame of the same length as the LTE system (e.g., as illustrated in FIG. 2), and sub-frame timing alignment may, for example, facilitate dual connectivity. In such embodiments, each subframe may have a number of TTIs due to the wider bandwidth afforded by use of the mmW band. In embodiments, a shorter TTI length (e.g., 100 µs) may be used to reduce latency.

FIG. 3 is a diagram of another example mmW frame structure. The example frame 300 illustrated in FIG. 3 is 1 ms in length and includes 10 subframes of 0.1 ms each. The example frame 300 accommodates a number of transmit beams, M, per synchronization sub-frame 320, 330 and has a sub-frame periodicity of one synchronization sub-frame 320, 330 per frame 300. In the illustrated example, the synchronization signals are located in the first sub-frame 320, 330 of each downlink frame 300 and are mapped to the M beams 305-310, as described in more detail below. In various embodiments, different numbers of beams M may be used per sub-frame and different sub-frame periodicities may be used.

Figure 4:
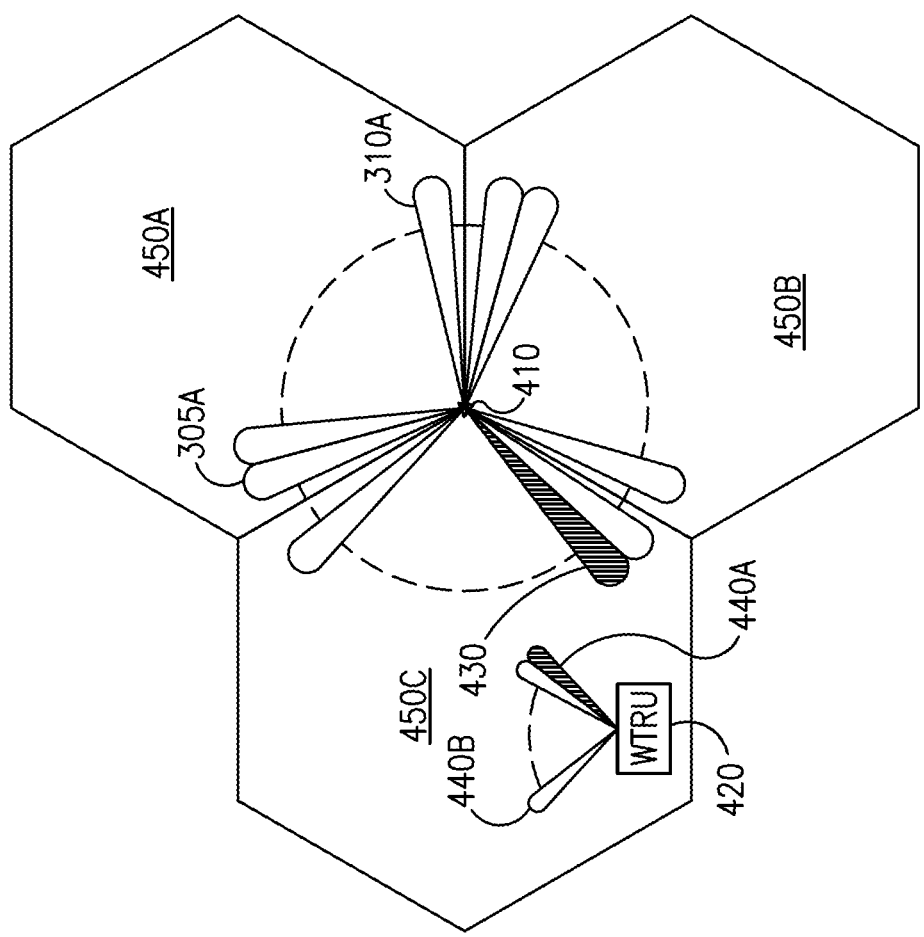
FIG. 4 is a diagram of an example of a 3-sector mmW base station site using M beams per cell and an example WTRU with N total receive breams.

FIG. 4 is a diagram of an example system 400 including a 3-sector mmW base station site 410 using M beams 305-310 per each of the three cells 450A, 450B and 450C and a WTRU 420 with N total receive breams 440. Although traditional hexagonal cell coverage is shown, mmW coverage may be less structured, for example, due to the effects of blockages. FIG. 4 also highlights an example beam pairing between receive beam 440A (beam index 1) of the WTRU 420 and eNB transmit beam 430 (beam index 2) from the cell 450C. For simplicity, FIG. 4 shows the WTRU 420 having a single array. However, to increase coverage, a WTRU may have more than one array.

In embodiments, a WTRU may use specific sequences mapped to a PSS and/or SSS to determine the beam and/or cell identity. In the embodiment illustrated in FIG. 3, for example, each of the M beams may carry both a common cell identity and a unique beam specific identity. In embodiments, each sequence may carry a signature that uniquely identifies a cell, a beam or a user. For example, a ZC sequence may be used with one ZC root sequence denoting one cell, and each beam of the cell may use a ZC sequence based on the root sequence and a pre-configured number of cyclic shifts. In another example, other sequences with desired auto-correlation and cross-correlation properties, such as a Golay sequence and a Gold sequence, may be considered. The sequence index may carry additional system information. For example, the PSS may carry the cell-specific identity, and the SS may carry the beam-specific identity.

A synchronization signal may also carry specific information that may be used to locate and identify another synchronization signal. For example, the PSS may carry implicit information in terms of a selected index, which may indicate the symbol distance between the PSS and its associated SSS. In other embodiments, the symbol distance between the PSS and the associated SSS may be pre-defined. In addition, one or more properties, such as resource mapping or scrambling sequence configuration of one synchronization signal type, may be derived based on its associated synchronization signal.

A synchronization signal may also have a specific beamforming configuration and properties, which may include, for example, beamwidth and associated gain, side lobe suppression level and transmit power of each antenna element. The beamwidth and properties of a synchronization signal may be tailored to the specific synchronization signal the synchronization signal beam (or beam) is associated with and may be fixed or variable. For example, a synchronization signal beam may have different bandwidth and properties depending on whether it is being used to provide cell-wide coverage or cover a smaller hotspot, for example.

Each synchronization signal may use a set of pre-defined sequences, and the configuration of the sequences may be different between different synchronization signals (e.g., the configuration of the sequences may be different for a PSS than for an SSS). The configuration may include, for example, sequence type, sequence length, and/or sequence modulation. Attributes of the sequence may include, for example, cell-specific identity and beam-specific identity. In embodiments, all of the beamformed synchronization signal types may carry the same cell specific sequence. In other embodiments, all synchronization signal types for one cell may use different sequences from one pre-defined set of sequences, and the sequence set may use certain properties to uniquely identity both the cell-specific and beam-specific information. For example, all sequences in the set may be based on the same base sequence with a different cyclic shift.

The beamforming configuration and periodicity used for a particular synchronization signal or synchronization signal type may depend on the type of service it is being used for in order to save energy. For example, enhanced broadband related services, such as very fast streaming, may use a different configuration than a low capacity, but highly reliable, service. Further, depending on user density and traffic type, a cell may use a different beamforming configuration for a hotspot.

Physical resources used for synchronization signals may include a group of physical resource elements, which may be the minimum schedulable physical layer resource of the mmW system. Each physical resource element may carry one symbol of a PHY control channel, PHY data channel, synchronization signal or reference signal. Further, each physical resource element may include one or more minimum physical resource units, which may be defined and specified in accordance with waveform, modulation and frame structure employed by the mmW system. The minimum resource units may include, for example, a minimum frequency resource unit, a minimum time resource unit and/or a minimum modulation unit. The minimum frequency resource unit may be, for example, a subcarrier applied in a multi-carrier waveform such as OFDM, SC-OFDM, filter bank multicarrier (FBMC), zero-tail spread-OFDM (ZT-s-OFDM), or unique word OFDM (UW OFDM). Another example of the minimum frequency resource unit may be a broad band carrier applied in a time domain single carrier waveform (SC). The minimum time resource unit may be, for example, a time domain Fast Fourier Transform (FFT) symbol applied in an SC waveform or an OFDM symbol in OFDM-based waveforms. With regard to the minimum modulation unit, for example, a modulated symbol may use different modulation schemes, such as binary phase shift keying (BPSK), quadrature PSK (QPSK), 16 quadrature amplified modulation (16-QAM) and 64-QAM. The modulated symbol may have a sequence of minimum modulation units that may represent a data symbol. The length of the sequence may depend on the modulation scheme.

In embodiments, a flexible mapping may be used for mapping synchronization signals to physical resources. For example, different synchronization signal types (e.g., PSS or SSS) may be transmitted according to a beam-specific physical resource mapping. The mapping may include, for example, beam-specific synchronization signal physical resource allocation, dwell time, sweep time and periodicity.

The dwell time of a synchronization signal may be the time the synchronization signal is transmitted continuously using the same eNB transmit beam. Each eNB transmit beam may be uniquely defined by the beam steering vector and its beam coverage. The eNB may perform a sweep by transmitting a synchronization signal in a set of eNB transmit beams according to a pre-determined order or pattern. Depending on eNB capability, the sweep may apply one single or multiple simultaneous beams at one time instance. Periodicity may determine the time between synchronization signal type transmissions in the same transmit beam and since the end of the previous transmission.

A synchronization signal configuration may include a maximum sweep time in terms of a time resource unit (e.g., symbol within a TTI, a number of TTIs or a number of subframes and a beam dwell time in terms of a time resource unit (e.g., symbol within a TTI)). The sweep time may be, for example, the number of TT's required for an eNB to sweep its transmit beams to cover the entire cell for one cycle. The maximum number of beamformed synchronization signals and their resource mapping may be predefined. When the number of beams supported by a cell is smaller than the maximum number of beams, the eNB may choose to repeat the beams.

Figure 5:
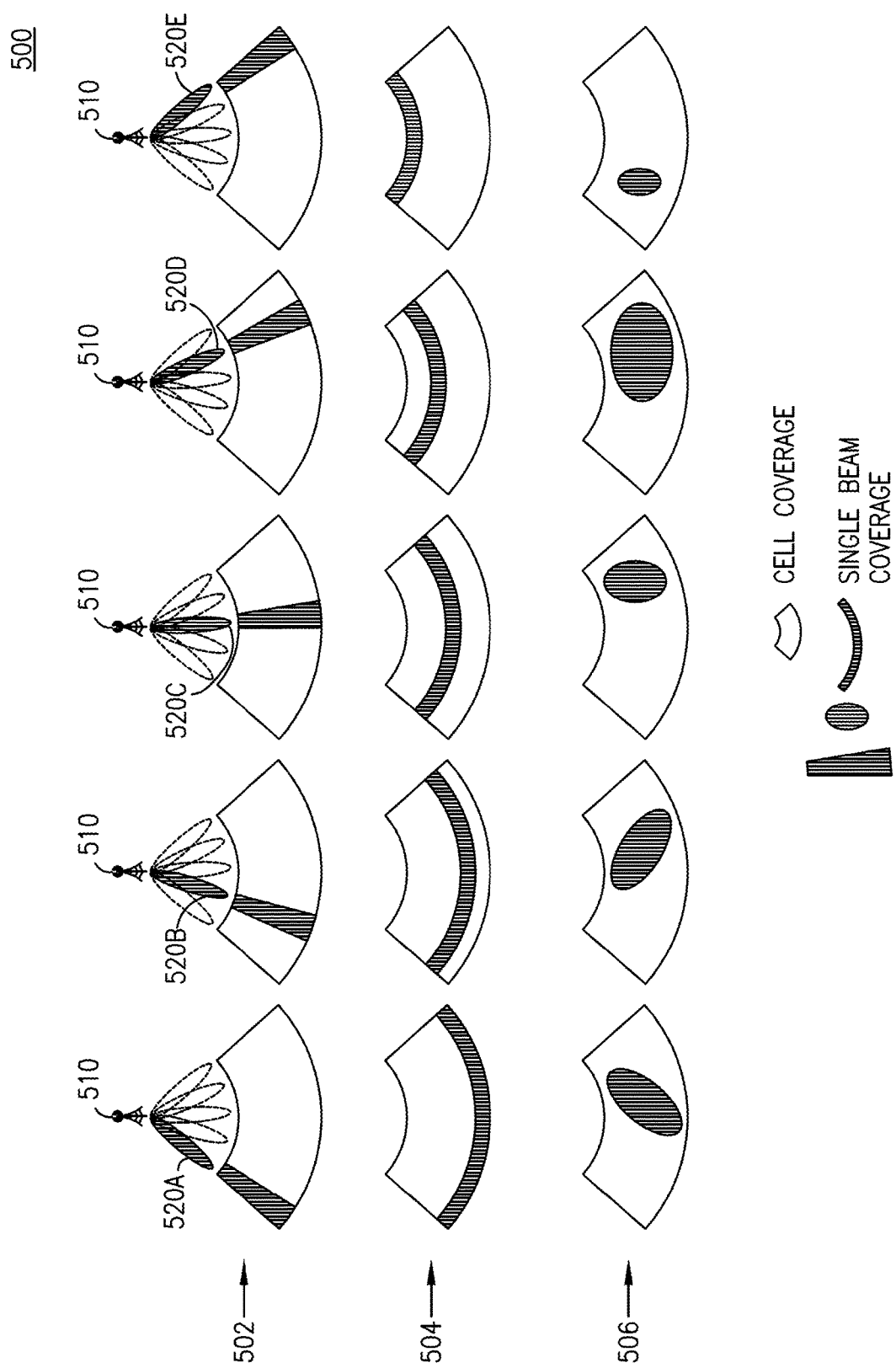
FIG. 5 is a diagram showing signal beam coverage examples with single beam configuration.

FIG. 5 is a diagram 500 showing signal beam coverage examples 502, 504 and 506 with a single beam configuration. In the illustrated example 502, an eNB 510 transmits a synchronization signal type (e.g., PSS or SSS) in a set of adjacent and consecutive eNB transmit beams 520A, 520B, 520C, 520D, 520E in the azimuth plane to provide cell-wide coverage for that synchronization type. The sweep time may be the sum of the dwell time of each eNB transmit beam. The eNB may perform another sweep of a different pattern with transmit beam coverage in an elevation plane as illustrated in example 504.

In embodiments, the eNB may use a different physical resource mapping for synchronization signals based, for example, on cell-specific statistics, such as distribution of user density and traffic types of different parts of a cell. As illustrated in example 506 in FIG. 5, different synchronization signal types may be mapped to transmit beams with different beam coverage. In addition, the physical resource allocation, dwell time, beam sweep time and periodicity of the synchronization signal type may be flexible and adjusted dynamically according to the statistics. For example, the eNB 510 may configure one synchronization signal type with a longer dwell time to synchronize with the cell. On the other hand, the eNB 510 may configure a shorter dwell time and a larger area when users may be sparse. The dynamic reconfiguration may be signaled, for example, in the system broadcast information or using dedicated signaling.

In embodiments, an eNB with multiple RF chains may reconfigure the synchronization signal type mapping to simultaneous multiple transmit beams to adapt the synchronization signal transmission based on desired cell and hot-spot coverage, cell-specific statistics including user density distribution and traffic type, and other real-time parameters. In embodiments, the eNB may transmit two simultaneous synchronization signals, which may be the same or different synchronization signal type. When the simultaneously transmitted synchronization signals are the same type, for example, they may have different dwell and sweep times. In embodiments, each synchronization signal may be mapped to a different and customized beam coverage.

Figure 6:
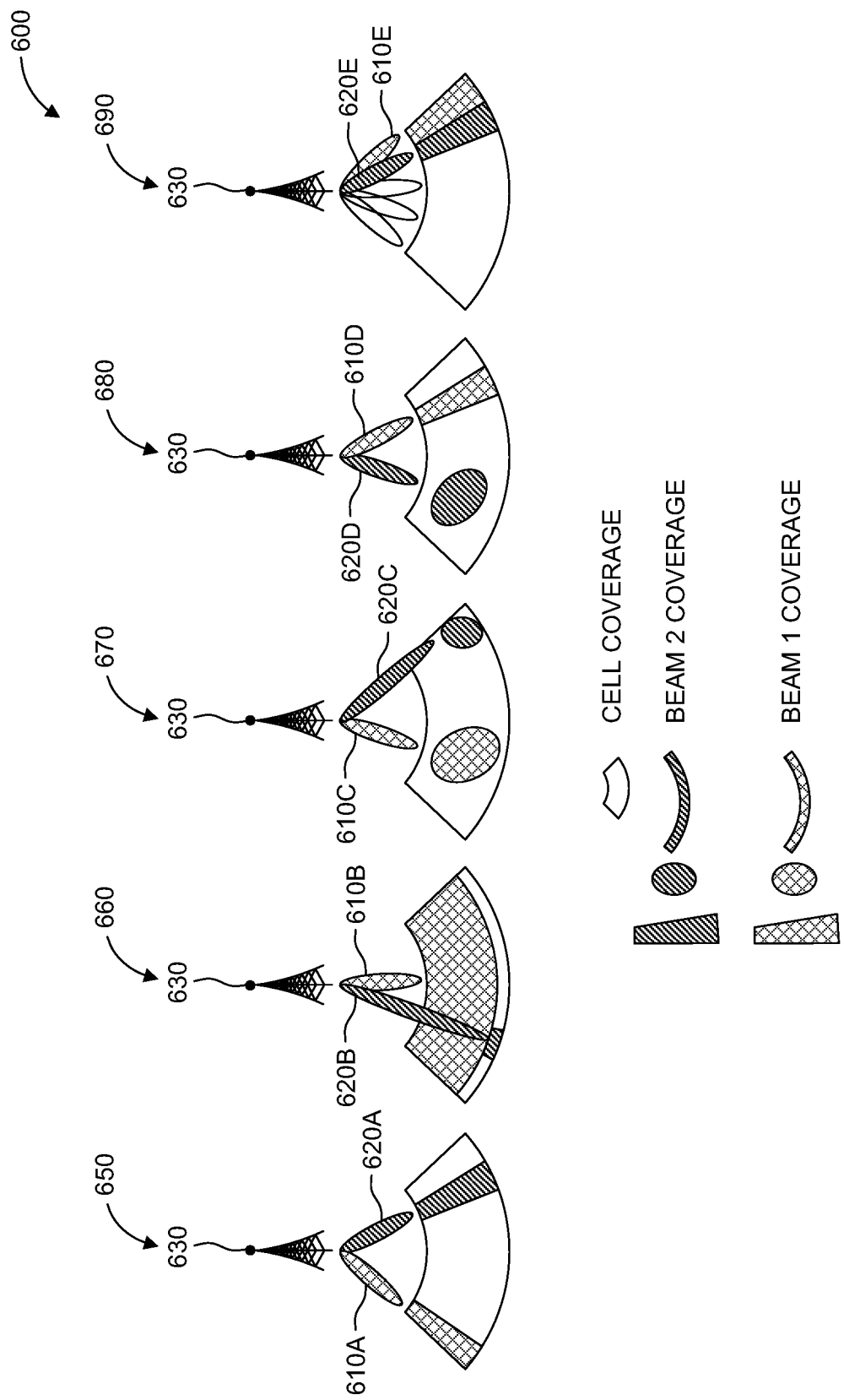
FIG. 6 is a diagram showing signal beam coverage examples with two simultaneous beams configured.

FIG. 6 is a diagram 600 of signal beam coverage examples with two simultaneous beams 610, 620 configured. As illustrated in examples 650 and 690 of FIG. 6, the eNB 630 may map one synchronization signal type to two transmit beams 610A, 610E and 620A, 620E with similar beam coverage area, and the eNB 630 may use these two beams 610A, 610E and 620A, 620E to cover different sectors or parts of the cell. Other configurations of the synchronization signal may be beam specific and different, such as with respect to frequency resource allocation, beam dwell time and periodicity. The eNB 630 may configure the mapping to provide different coverage areas as required, for example, by statistics, such as user density. In examples 650 and 690, for example, the eNB 630 may apply a longer dwell time in certain areas of the cell on a condition that, for example, the users of the cell are more concentrated in these areas.

In an embodiment, such as illustrated in example 660 of FIG. 6, the eNB 630 may transmit one synchronization signal 610B with low power and wide beamwidth for cell-center users and may simultaneously transmit another synchronization signal 620B with high power and narrow bandwidth for cell edge users. The eNB 630 may configure different synchronization signal type mapping parameters, such as dwell time, sweep time, and synchronization region, to further customize the synchronization signal's coverage and availability.

In the embodiment illustrated in example 670 of FIG. 6, the eNB 630 provides two hotspot coverages 610C, 620C with both of synchronization signals with narrow beam and long dwell time, on a condition that, for example, user distribution in the cell is high in those two areas. In the embodiment illustrated in example 680 of FIG. 6, the eNB 630 may apply one synchronization signal beam 610D to perform cell-wide coverage while using another synchronization signal beam 620D for ad-hoc hotspot coverage.

As described above, in the frame structure of FIG. 3, the synchronization signals are transmitted in a synchronization region in the first sub-frame 320, 330 of each frame 300, and the frame and sub-frame each have a shortened length of 1 ms and 0.1 ms, respectively. However, in mmW embodiments that use a subframe that has the same length as an LTE subframe (e.g., sub-frames are 1 ms in length), as described above, the synchronization region may be configured differently. For example, the synchronization region may include a number of minimum resource units (e.g., symbols) in one TTI. These symbols may be consecutive or intermittent, and the synchronization region may start from the beginning or end of a TTI. The number of symbols, or the length of the synchronization region, may vary depending on, for example, how many synchronization signal types are to be transmitted and the dwell time of each synchronization signal beam in each TTI. The synchronization region may, thus, be specific to a TTI and may be flexibly set by the eNB depending on the beam availability and/or user distribution in the cell. The eNB may dynamically configure the synchronization region, as well as the eNB transmit coverage, beam dwell time, beam sweep time and periodicity, as described above, to customize each synchronization signal type's coverage and availability based on one or more cell-specific statistic, such as desired coverage areas, distribution of user density, distribution of traffic type and inter-beam interference.

The eNB may map one or more synchronization signal types to one synchronization region or one or more consecutive symbols. The eNB may configure the location of the synchronization region within a TTI, such as the beginning and end of the TTI, and the duration of the synchronization region, such as the number of symbols, based on eNB capability, synchronization signal type, mapped beam dwell time and sweep time, cell-specific distribution of user density, cell-specific distribution of traffic type, inter-beam interference and other real time cell-specific statistics.

The eNB may apply synchronization signal type mapping to physical resources within the eNB transmit beam according to a static and pre-defined configuration, a semi-static configuration by higher layer signaling, or dynamic configuration by higher layer signaling. The eNB may send semi-static or dynamic synchronization signal type mapping reconfiguration information in a system information broadcast and/or dedicated signaling.

The eNB may transmit a synchronization signal at each symbol location in a synchronization region using a corresponding eNB transmit beam. The mapping of the synchronization signals in the time domain (e.g., to symbol locations in the synchronization region) and in the spatial domain (e.g., to the eNB transmit beams) may be as shown in Table 1 below. The synchronization signal types may be the same as, or different between, different symbols or different transmit beams.

TABLE 1

| | Symbol 1 | Symbol 2 | Symbol 3 | Symbol 4 | Symbol 5 |
|---|---|---|---|---|---|
| eNB transmit beam 1 | Synchronization signal type A | | | | |
| eNB transmit beam 2 | | Synchronization signal type A | | | |
| eNB transmit beam 3 | | | Synchronization signal type A | | |
| eNB transmit beam 4 | | | | Synchronization signal type A | |
| eNB transmit beam 5 | | | | | Synchronization signal type A |

For example, one type of synchronization signal mapping may enable a sweeping operation of one synchronization signal type by mapping the same synchronization signal type to each symbol of the synchronization region and to a number of adjacent eNB transmit beams with a combined coverage of an entire cell. In an embodiment, such as provided in Table 1 above, the eNB may map the same synchronization signal type (such as PSS) to each of the 5 transmit beams and map them to a synchronization region in one TTI using consecutive symbols (e.g., each beam with one symbol dwell time from the beginning of the TTI). This embodiment will be described in more detail below with respect to FIG. 7.

In another embodiment, the synchronization signal mapping may be as provided in Table 2 below. In this embodiment, the eNB may map two synchronization signal types (e.g., PSS and SSS) to beam 1 and beam 2 and allocate them to the synchronization region within one TTI with one beam having one symbol dwell time and the other having three symbol dwell time. This embodiment will be described in more detail below with respect to FIG. 12.

TABLE 2

| | Symbol 1 | Symbol 2 | Symbol 3 | Symbol 4 |
|---|---|---|---|---|
| eNB transmit beam 1 | Synchronization signal type A | | | |
| eNB transmit beam 2 | | Synchronization signal type B | Synchronization signal type B | Synchronization signal type B |

In embodiments, an eNB may map each synchronization signal according to a specific frequency resource allocation, such as a group of pre-determined sub-carriers. Synchronization signal types may have different frequency resource allocations based on, for example, scheduling parameters and inter-beam interference. The synchronization signal types' frequency and resource allocations may be predefined and/or signaled in system broadcast information and/or dedicated signaling.

The synchronization region may be configured and re-configured based, for example, on changing cell characteristics. In embodiments, the synchronization region may include a plurality of adjacent symbol locations in a single TTI such that an eNB may transmit the same synchronization signal type at each consecutive symbol location in a set of adjacent eNB transmit beams with the same dwell time to provide uniform cell-wide coverage.

Figure 7:
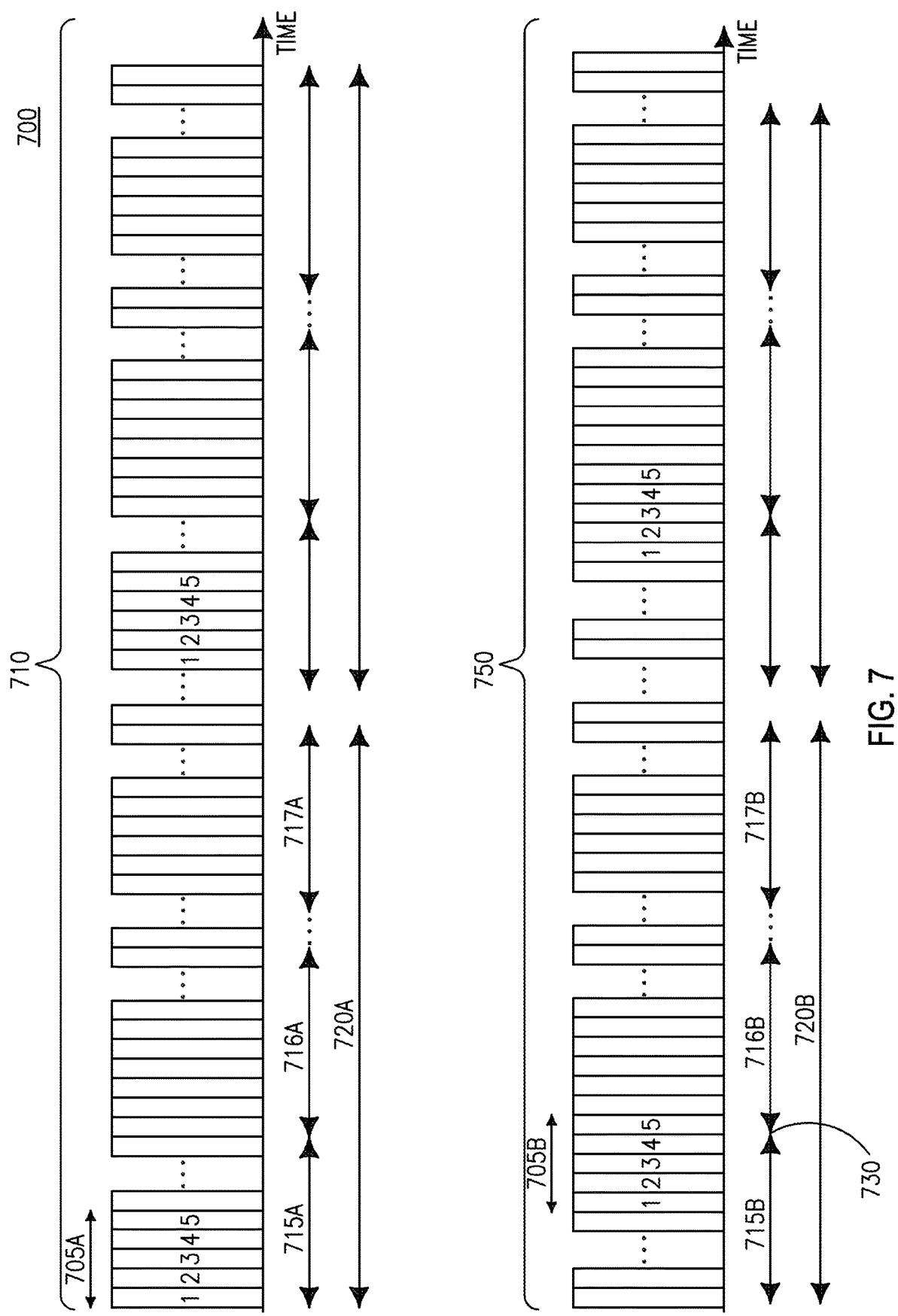
FIG. 7 is a diagram of example sub-frames that use uniform and full sweep in one synchronization region.

FIG. 7 is a diagram 700 of example sub-frames that use uniform and full sweep in one synchronization region. In FIG. 7, each sub-frame 720A, 720B includes a number of TT's 715A, 715B; 716A, 716B; 717A, 717B. The synchronization region 705A, 705B is transmitted periodically every M subframes and includes five consecutive symbols. In each of the illustrated examples 710 and 750, each of the five symbols is mapped to one of five eNB transmit beams, and the duration of synchronization region 705A, 705B is the sum of the dwell time of each used transmit beam. In the example 710 illustrated in FIG. 7, the synchronization region 705A begins at the beginning of the first TTI 715A in the subframe 720A. However, as shown in example 750, an eNB may transmit the synchronization region 705B growing backwards from the end 730 of a TTI (e.g., TTI 715B).

In embodiments, the time resource unit may be a pre-defined time unit, TTI, subframe or frame. The eNB may flexibly adjust the duration of the synchronization region spanning over the end of the time resource unit, and a WTRU may detect the TTI, subframe or frame start timing based on the synchronization region and the pre-defined number of base time resource units (e.g., symbols) for each TTI, subframe or frame. In embodiments, a WTRU may derive the TTI timing based on the detected synchronization signal type and the pre-defined and/or beam-specific signaled synchronization signal type mapping. For example, a WTRU may detect, for example using blind detection, a PSS at symbol 3 in TTI 715 and may infer the timing of the beginning of the TTI based on the detected PSS symbol timing and an offset of two-symbol duration. In other embodiments, a beam-specific symbol distance between the PSS and physical broadcast channel (PBCH) may be pre-defined, and the WTRU may first decode the PBCH and read the content to determine the beginning of the TTI and the TTI number.

Figure 8:
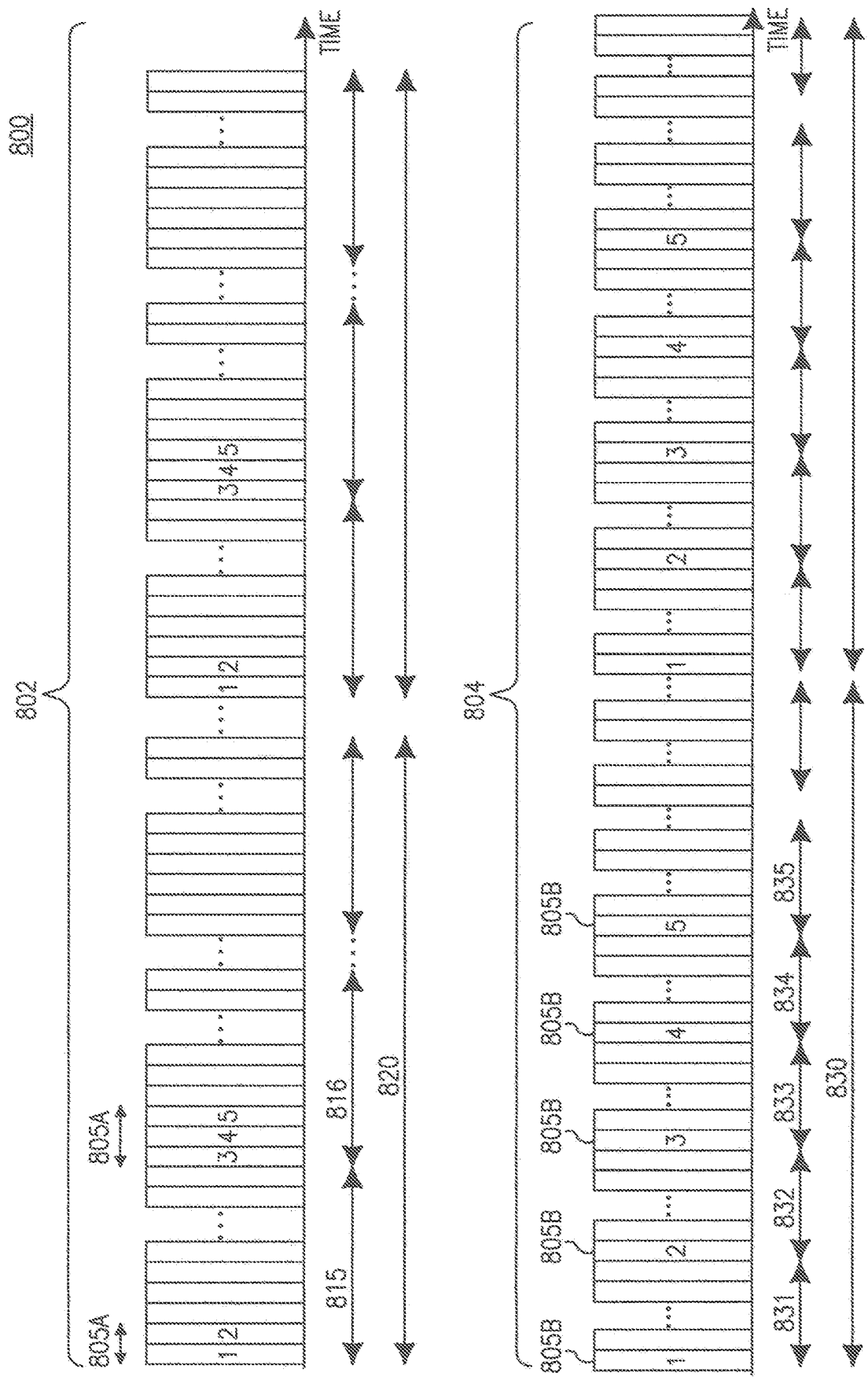
FIG. 8 is a diagram of example sub-frames that use uniform and full sweep in a multiple-TTI synchronization region.

In other embodiments, the eNB may use different eNB transmit beams for the symbols in the synchronization region of each TTI to perform a sweep across multiple TTIs. FIG. 8 is a diagram 800 of example sub-frames that use uniform and full sweep in a multiple-TTI synchronization region 805A, 805B. In the illustrated example 802, a two-TTI synchronization region 805A is configured. In TTI 815, the eNB transmit beams 1 and 2 are mapped to the first two symbols of synchronization region 805A. In TTI 816, the eNB configures a three-symbol region with each symbol mapped to eNB transmit beam 3, 4 and 5. In the illustrated example 804, the synchronization region 805B includes 1 symbol in each of five consecutive TTIs 831, 832, 833, 834, 835. Compared to the synchronization regions configured in the examples of FIG. 7, the eNB may configure a short synchronization region in each TTI, for example, to allow for more symbols for data transmission. However, the resulting sweep to cover the entire cell may take more time and, thus, may increase the synchronization latency.

An eNB may dynamically configure the synchronization region with a number of minimum time resource units (or symbols) based on eNB capability in terms of the number of supported eNB transmit beams or system constraints and requirements regarding how many symbols may be available for synchronization regions, the coverage intended by the synchronization signal type and the distribution of user density and traffic type intended by the synchronization signal type.

The eNB may reconfigure the synchronization region and dynamically change the synchronization signal type mapping to the physical resource. The flexible mapping may provide the eNB with tailored coverage with reduced interference, adaptability to distribution of user density and traffic type, reduced signaling overhead and lower energy consumption. An eNB may reconfigure the synchronization signal type mapping by, for example, reducing or increasing the synchronization region with fewer or more symbols, sweeping eNB transmit beams within one TTI or across multiple TTIs and changing sweep time specific to the mapped eNB transmit beam, decreasing or increasing the dwell time of each mapped eNB transmit beam by allocating fewer or more symbols in the synchronization region to the beams (including switching on and off one or multiple eNB transmit beams), mapping with a new order or pattern of eNB transmit beams to symbols of the synchronization region, and/or applying an eNB transmit beam with one or multiple different beamforming properties (such as beam width, beam gain, beam transmit power, beam shape, and/or beam sidelobe suppression ratio).

Figure 9:
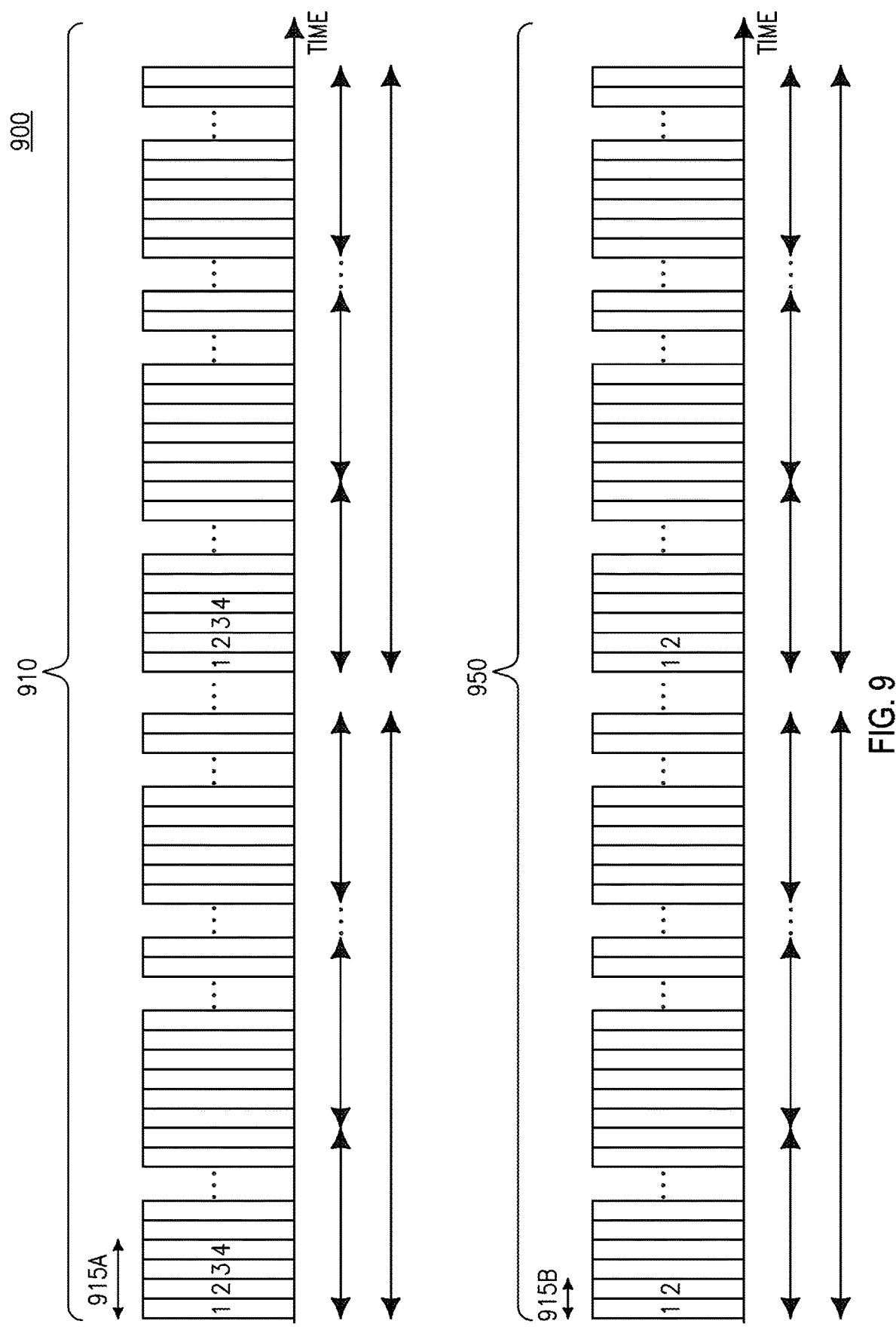
FIG. 9 is a diagram of an example synchronization region re-configuration.

FIG. 9 is a diagram 900 of an example synchronization region re-configuration. In the example illustrated in FIG. 9, an eNB initially configures the synchronization region 915A in 910 over 4 symbols with respective mapping to transmit beams 1, 2, 3 and 4. In 950, the eNB re-configures the synchronization region 915B by switching the synchronization in eNB transmit beams 3 and 4 off to reduce the synchronization region 915 from four symbols to two symbols. This may be done, for example, due inactivity of users in the beam coverage.

Figure 10:
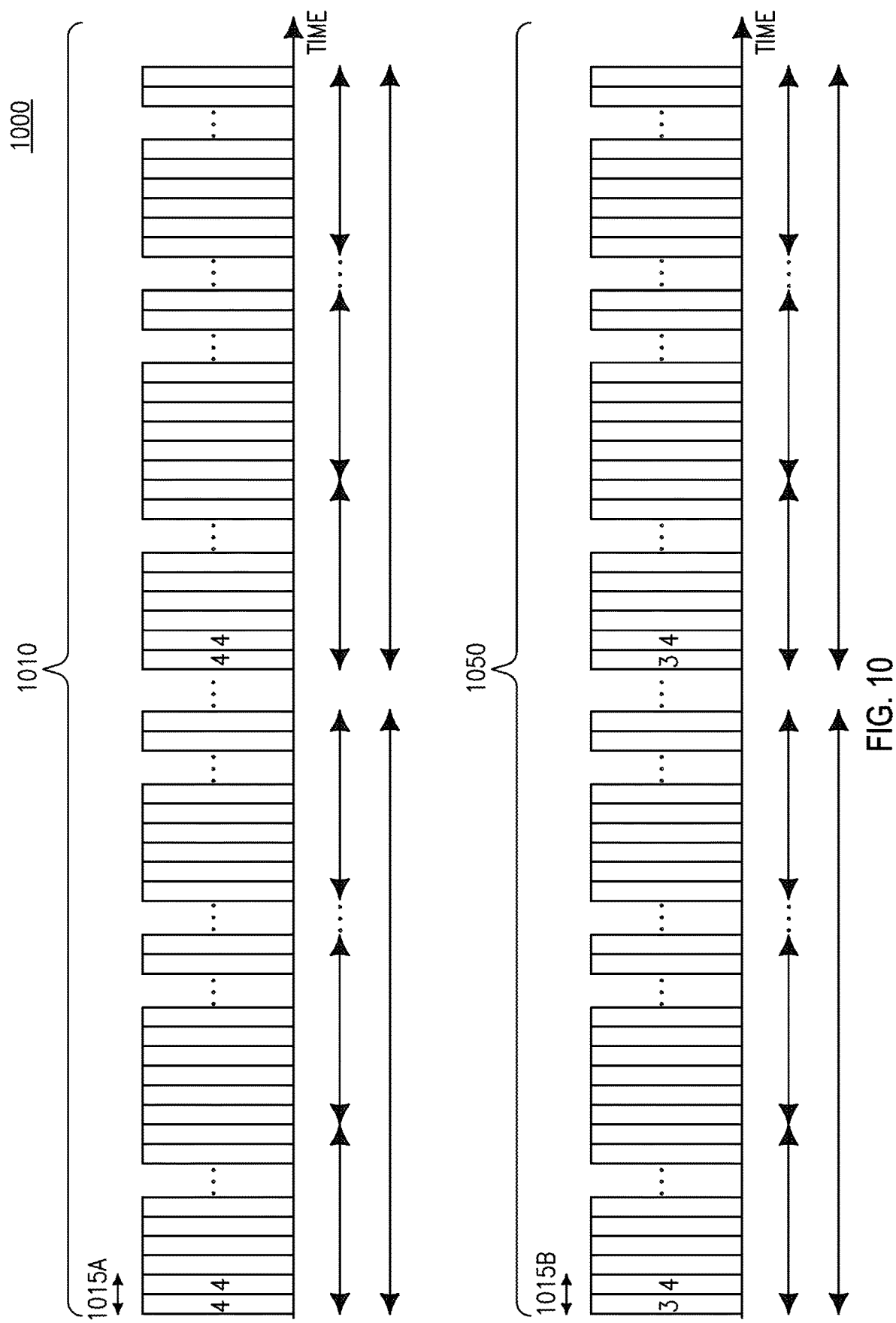
FIG. 10 is a diagram of another example synchronization region re-configuration.

FIG. 10 is a diagram 1000 of another example synchronization region re-configuration. In the example illustrated in FIG. 10, the eNB initially configures the synchronization region 1015A in 1010 with a synchronization mapping only to beam 4 with an increased dwell time of 2 symbols, for example, due to reduced activities in the beam coverage. In 1050, the eNB re-configures the synchronization region 1015B by switching on eNB transmit beam 3, for example, due to increased user density in eNB transmit beam 3 coverage. In this example, the eNB may keep the synchronization region duration and reconfigure the dwell time of eNB transmit beam 4 to allow the addition of eNB transmit beam 3 in the synchronization region. In embodiments, the eNB may not change the sweep time of the synchronization signal type carried on eNB transmit beam 4.

As a result of reconfiguring the synchronization region, symbols previously used by the removed synchronization signal types may be repurposed. The eNB may maintain the synchronization region length by repeating one or more synchronization signal types in the same mapped eNB transmit beams in repurposed symbols (e.g., increasing the dwell time of the mapped synchronization signal types). In other embodiments, the eNB may use these symbols for downlink data channel transmission, for example, the physical downlink shared channel (PDSCH). The eNB may also apply discontinuous transmission (DTX) at these symbols to reduce energy consumption.

The eNB may signal the synchronization signal type mapping reconfiguration in a system information broadcast or using dedicated signaling. The WTRU may adjust its synchronization signal type detection and measurement according to the reconfiguration and may include any repurposed symbols for data channel decoding.

Figure 11:
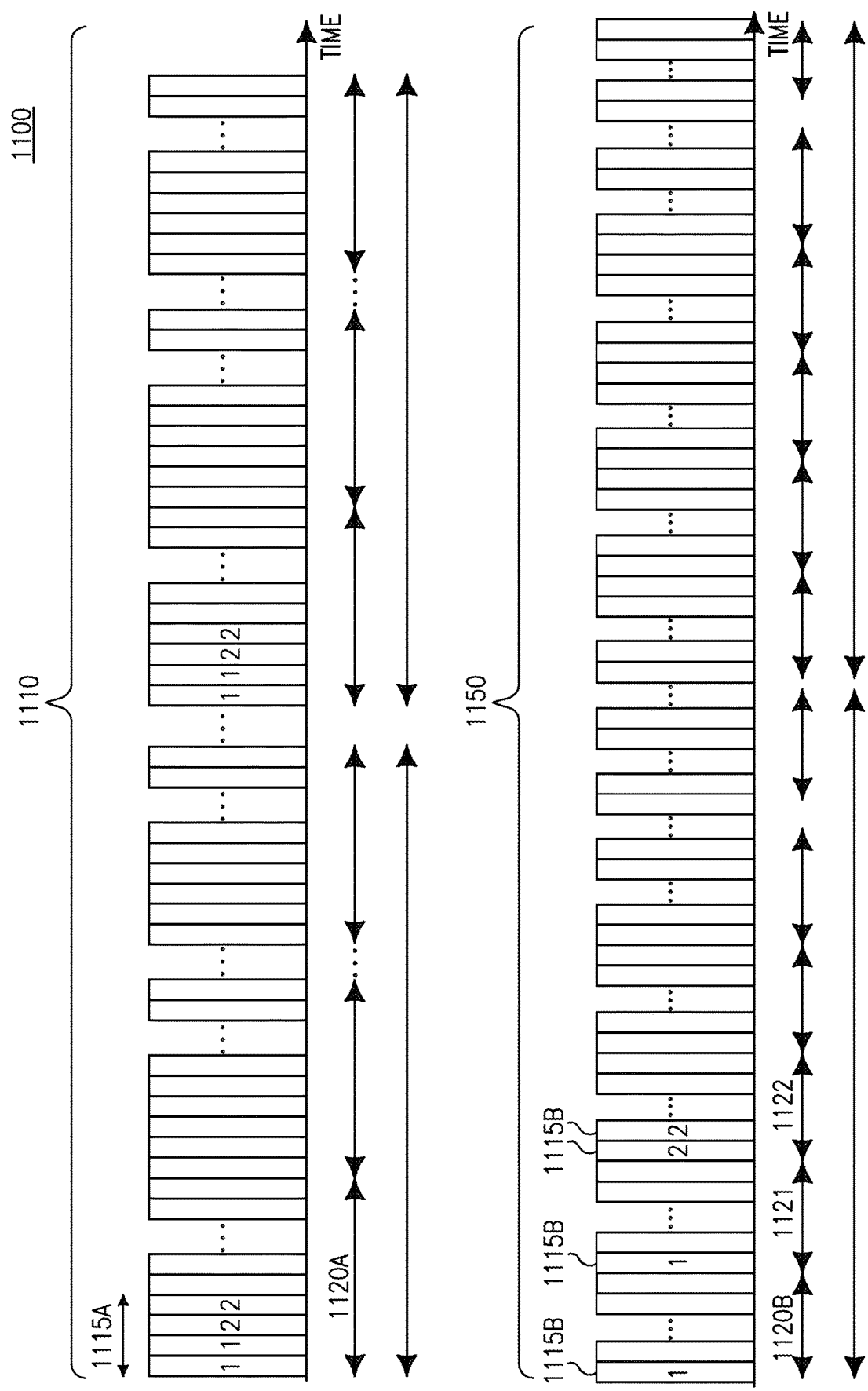
FIG. 11 is a diagram of an example of a flexible mapping and dwell time reconfiguration.

An eNB may reconfigure the synchronization signal type mapping by both changing the duration of the synchronization region and/or splitting the synchronization region among a plurality of TTIs. FIG. 11 is a diagram 1100 of an example of a flexible mapping and dwell time reconfiguration. In the example illustrated in FIG. 11, the eNB initially configures a synchronization region 1115A of four symbols in TTI 1120A. In 1150, the eNB splits the synchronization region 1115B into three regions, including one region of one symbol in TTI 1120B mapped to eNB transmit beam 1, one region of one symbol in TTI 1121 mapped to eNB transmit beam 1, and one region of two symbols in TTI 1122 mapped to eNB transmit beam 2. The reconfiguration may be done by the scheduler due to variation in the availability and usage of the eNB transmit beam.

As described above, the eNB may employ a heterogeneous set of transmit beams having different properties (e.g., beamwidth, transmit power, side lobe suppression, and/or beam shape) and may map a synchronization signal to one or multiple specific transmit beams in the set based on one or more of the properties of the transmit beam. In embodiments, omnidirectional beams may be used, for example, for cell center users or those WTRUs with high quality radio links. These users may take advantage of the omnidirectional synchronization signals, which may be transmitted more frequently, and cell access latency may be reduced.

In embodiments, omni-directional and beamformed synchronization signals may reside in different beams but may be placed in the same TTI at different symbol locations or in different TTIs at the same symbol locations. Cell selection criteria for mmW cells may be enhanced by enabling scaling of measured cell receive level based on whether the corresponding beam type is omni-, wide or narrow, thus ensuring selection of the most appropriate cell for camping.

In connection with beamformed cell access, the selected beam/cell may have a direct impact on the random access (RACH) procedure. In mmW systems, in order for the network to operate efficiently, the mmW cell should be aware of the appropriate receive beam or beams to use for receiving RACH transmissions on their corresponding RACH resources. The mmW cell can assign one or more RACH resource sets to each downlink transmit beam based on a linkage between the downlink transmit beam and its associated uplink receive beams with corresponding spatial coverage. With flexible cell access, RACH resource configuration, such as preamble sequences, frequency allocation, transmission opportunities, etc., may be optimized for different beam types based on their specific needs, thus ensuring a high success rate and low latency for different groups of users. Apart from initial access procedures, neighbor cell measurement overhead for mmW systems may be significantly high in connected mode. The flexibility for mmW cells to transmit multiple beam types using different sequence, periodicity, and time-domain placement may significantly reduce WTRU measurement overhead and improve throughput without sacrificing required robustness.

Figure 12:
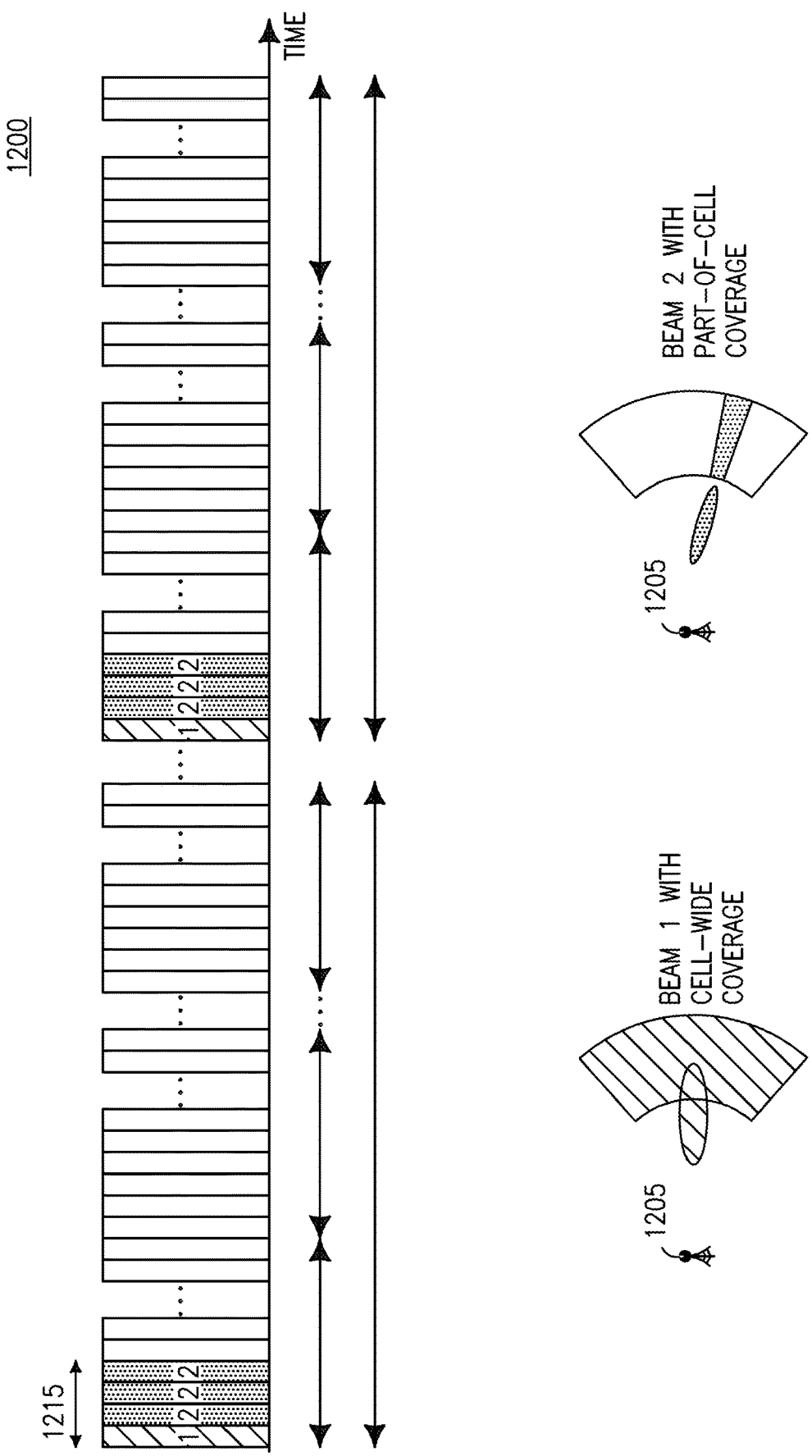
FIG. 12 is a diagram of an example mapping of synchronization signals to heterogeneous eNB transmit beams.

FIG. 12 is a diagram 1200 of an example mapping of synchronization signals to heterogeneous eNB transmit beams. In the example illustrated in FIG. 12, the eNB 1205 employs beam 1, which has cell-wide coverage, and beam two, which has part-of-cell coverage. Beam 1 is mapped to the first symbol in the synchronization region 1215 and beam 2 is mapped to the following three symbols in the synchronization region 1215. In an embodiment, the eNB 1205 may map the PSS to the eNB transmit beam 1 with coverage of the entire cell and the SSS to the narrower transmit beam 2.

The eNB 1205 may also map the symbol locations to the synchronization signals according to the transmit beam properties. In the example illustrated in FIG. 12, for example, the PSS may be mapped to one symbol (with short dwell time) and the SSS may be allocated with three symbols (with long dwell time). This may be done because, with cell-wide coverage provided by eNB transmit beam 1, a WTRU may receive the PSS in eNB transmit beam 1 more easily compared to SSS carried in eNB transmit beam 2.

Figure 13:
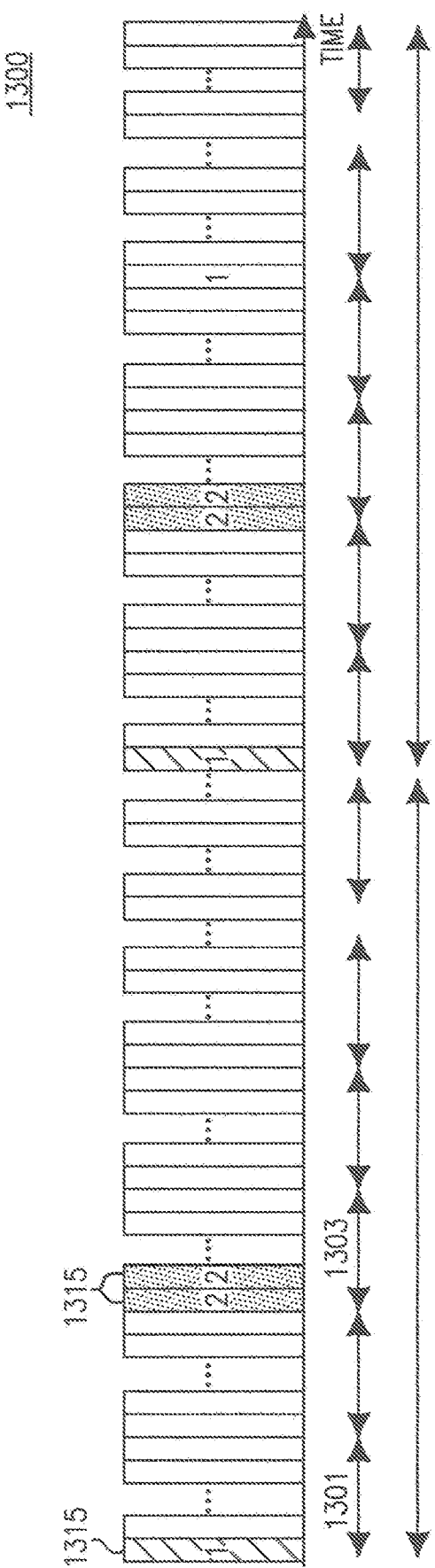
FIG. 13 is a diagram of an example mapping of synchronization signals to heterogeneous transmit beams in different TTIs.

FIG. 13 is a diagram 1300 of an example mapping of synchronization signals to heterogeneous eNB transmit beams in different TTIs. In the example illustrated in FIG. 13, the synchronization signal types are located in a synchronization region 1315 that is split over TTIs 1301 and 1303. In embodiments, each synchronization signal type may have a dedicated synchronization region in a designed TTI.

In embodiments, such as the example illustrated in FIG. 13, an eNB may embed a linkage between different synchronization signal types, and a WTRU may detect one synchronization signal (e.g., PSS) first and use the linkage information to subsequently locate and detect another synchronization signal (e.g., SSS). The linkage information may be explicitly carried in a data packet or implicitly embedded, such as using the selected sequence, the applied time and frequency resource, or the used eNB transmit beam. The linkage information may include, for example, symbol distance to the linked synchronization signal, eNB transmit beam index of the transmit beam used by the synchronization signal, frequency resource offset to the linked synchronization signal and/or sequence index used for the linked synchronization signal.

In another example, multiple synchronization signal types may be transmitted at the same time resource unit (e.g., same symbol). One synchronization signal type may use a wide eNB transmit beam that may provide cell-wide coverage, and another co-located synchronization signal type may use a narrow eNB transmit beam covering a part of the cell. The co-located synchronization signal types may employ different sequences and/or frequency resources for WTRUs to detect.

Figure 14:
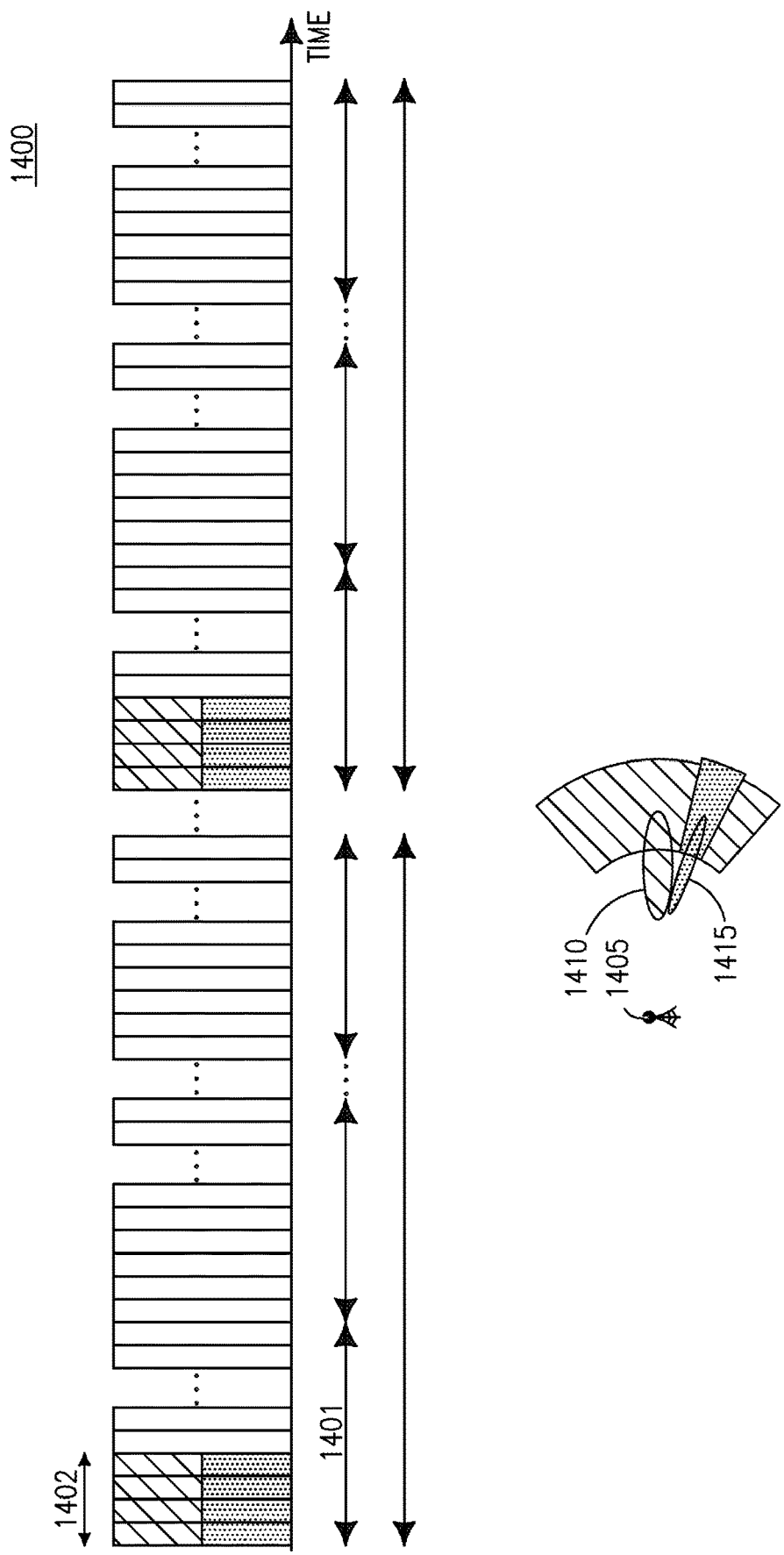
FIG. 14 is a diagram of an example mapping of synchronization signal types to heterogeneous eNB transmit beams at the same symbols.

FIG. 14 is a diagram 1400 of an example mapping of synchronization signal types to heterogeneous eNB transmit beams at the same symbols. In the example illustrated in FIG. 14, an eNB 1405 may map the PSS and/or SSS in both the transmit beam 1410 and the transmit beam 1415 in the same first four symbols of TTI 1401. Transmit beam 1410 may provide cell-wide coverage and transmit beam 1415 may have improved link budget with higher beamforming gain and with sweeping coverage.

A WTRU may detect both synchronization signal types at the same symbol locations using a different sequence for detection or at different frequency resources. The WTRU may select between the detected synchronization signal types according to pre-defined and/or pre-configured rules. For example, the cell-center WTRUs may detect multiple synchronization signal types due to low path loss to the eNB, and the WTRUs may select the synchronization signal type carried in the eNB transmit beam covering the entire cell so that the following broadcast channel decoding may not require beam sweeping and pairing and, thus, may have lower latency. In this case, the selected synchronization signal type may not have the highest energy detected at the WTRUs but may have energy above a pre-defined threshold. Cell-edge WTRUs may detect multiple synchronization types, and they may select the synchronization signal types with the highest detected energy in order to more successfully detect the following broadcast channel associated with the synchronization signal type.

A broadcast channel may provide all necessary information specific to a cell and/or the beam that may carry the broadcast channel in order for a WTRU to gain access to the cell. The information content of the broadcast channel may be referred to as master information block (MIB) information. A beamformed broadcast channel may be transmitted using digital and/or analog beamforming to provide improved broadcast channel link performance. The formed eNB transmit beam may cover an entire cell, or part of the cell, depending on the beamforming weights applied to the broadcast channel. In the embodiments described herein, the broadcast channel may be, for example, a PBCH.

Cell-specific and/or beam-specific information carried in the beamformed broadcast channel may include, for example, beam information, cell information, timing information, and/or associated control channel linkage. Beam information may include, for example, beam identity, number of beams of the cell, beam dwell time, beam sweep time, beam sequence index, beam sweep/schedule, and/or beam scrambling. Cell information may include, for example, cell system bandwidth and/or system frame number (SFN). Timing information may include all information necessary for WTRUs to determine various timing of the cell, beam and associated channels, for example. Such timing information may include, for example, TTI number, subframe number, frame number, system number, timing offset in terms of time resource units (e.g., number of symbols between the broadcast channel and the start of the TTI/subframe/frame or any combination thereof), and/or timing offset in terms of number of time resource units (e.g., number of symbols between the broadcast channel and its associated control channels, including downlink link format, downlink control channel, and/or downlink HARQ feedback channel).

Associated control channel linkage may include, for example, all information necessary for WTRUs to locate and demodulate the associated control channels and data or shared channels. A resource allocation and configuration of the control channel associated with the broadcast channel, such as the PDCCH, may be co-located in the same eNB transmit beam and may include, for example, the size of the control channel region in terms of number of symbols and a frequency resource allocation. The associated control channel may use another eNB transmit beam, and the broadcast channel may provide the beam information listed above for the control channel beam. When the control channel applies a different reference signal for broadcast channel demodulation, the associated control channel linkage may include a resource allocation and configuration of the reference signal used to demodulate the associated control channel. The information may include, for example, the reference signal type, sequence length, symbol location, and/or frequency resource allocation. In embodiments, the broadcast channel may contain information for mapping the beam-specific reference signal to the associated control channel within the beam. The configuration of the control channel may also include fixed and flexible mapping to the physical resource, such as the number of symbols used for the control channel and/or the index of the beam carrying the control channel.

The associated channel linkage may also include resource allocation and configuration of the format indication channel, such as the physical control format indicator channel (PCFICH) where the associated control channel configuration may be found. The configuration may include beam-specific information, such as beam index and beam specific reference signal for the format indication channel demodulation. The associated channel linkage may also include resource allocation and configuration of a downlink HARQ feedback channel, such as the PHICH where downlink acknowledgement/negative acknowledgement (ACK/NACK) may be transmitted. The configuration may include beam information specific to the downlink HARQ feedback channel, such as the beam index and beam-specific reference signal for HARQ feedback channel demodulation.

Figure 15:
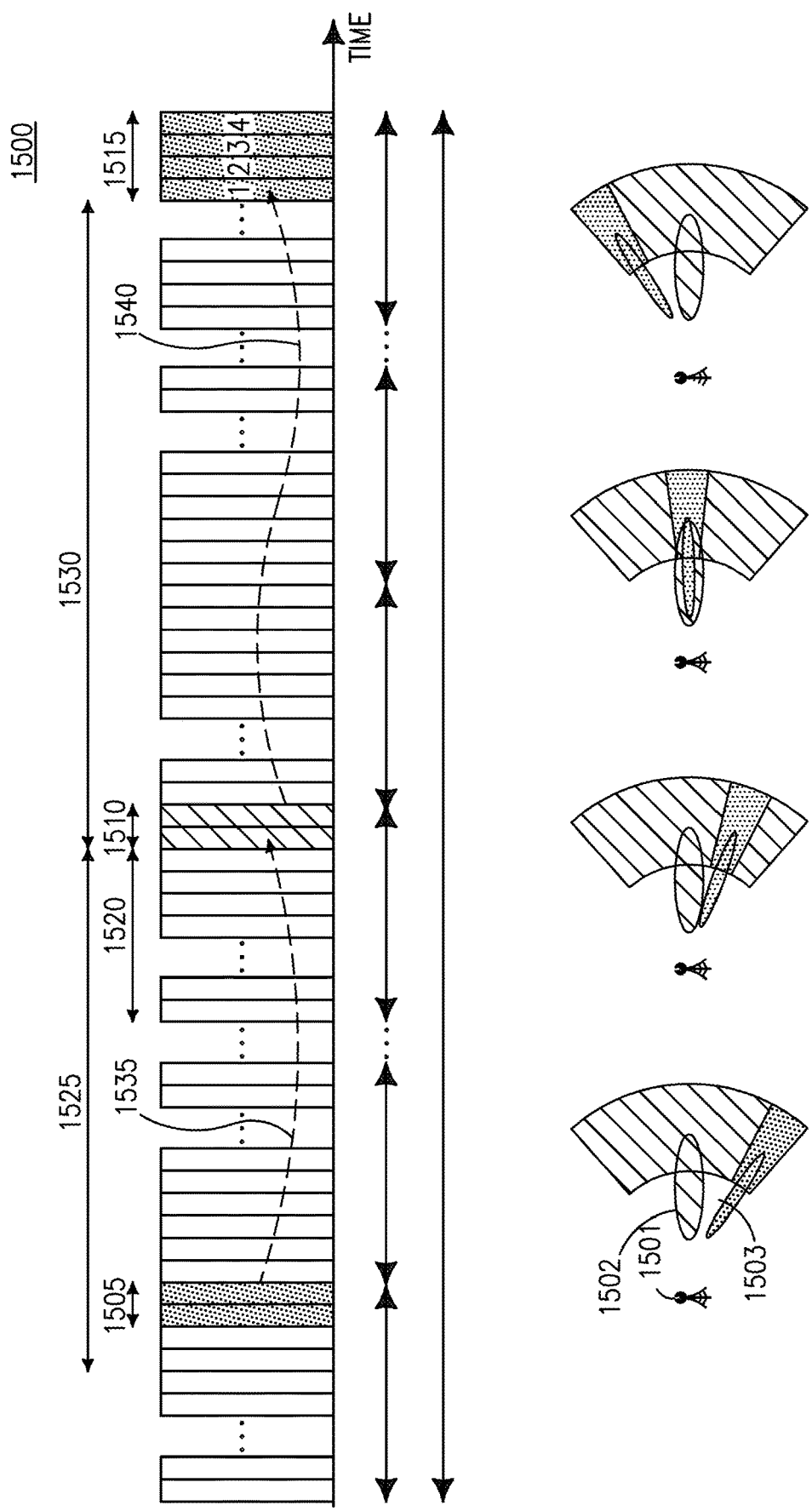
FIG. 15 is a diagram of an example mapping where the master information block (MIB) is divided such that the beam information is transmitted on a cell-wide eNB transmit beam and the rest of the MIB is transmitted in a narrow transmit beam.

In a beamformed system, an eNB may transmit multiple beamformed broadcast channels for one cell and transmit a different part of MIB information in each beamformed broadcast channel. FIG. 15 is a diagram 1500 of an example mapping where the MIB is divided such that the beam information (also referred to as pre-MIB) is transmitted on a cell-wide eNB transmit beam and the rest of the MIB is transmitted in a narrow transmit beam. In the example illustrated in FIG. 15, an eNB 1501 is configured with a wide beam 1502 and a narrow beam 1503. Using a mapping such as illustrated in FIG. 15, a WTRU may first receive one or more synchronization signal types (e.g., PSS/SSS) in synchronization region 1505. The synchronization region 1505 may be mapped to any of the wide or narrow beams, as described above. A WTRU may use linkage information obtained from a synchronization signal, or pre-configured information, such as a symbol distance offset 1525 and/or a symbol distance offset to TTI start 1520, to detect and decode a first (wide-beam) PBCH region 1510. The linkage between the synchronization region 1505 and the first PBCH region 1510 is illustrated in FIG. 15 by the arrow 1535.

The WTRU may receive pre-MIB in the cell-wide broadcast channel and use the pre-MIB information to detect and decode the next beamformed channel in a second PBCH region 1515 mapped to the narrow eNB transmit beam 1503. For example, the WTRU may use a symbol offset between the first PBCH region 1510 and the second PBCH region 1515 to detect and decode the second PBCH region 1515. The linkage between the two PBCH regions is illustrated by the arrow 1540 in FIG. 15. This hierarchical broadcast channel configuration may significantly reduce the time WTRUs may use to sweep and pair beams to receive the beamformed broadcast channel in the narrow eNB transmit beam.

A beamformed broadcast channel may be associated with different synchronization signal types and, thus, different eNB transmit beams. There may be an explicit or implicit linkage between the synchronization signal and the associated broadcast channel beam. A beamformed broadcast channel may be associated with a synchronization signal type in a one-to-one mapping or in a one-to-many mapping.

Figure 16:
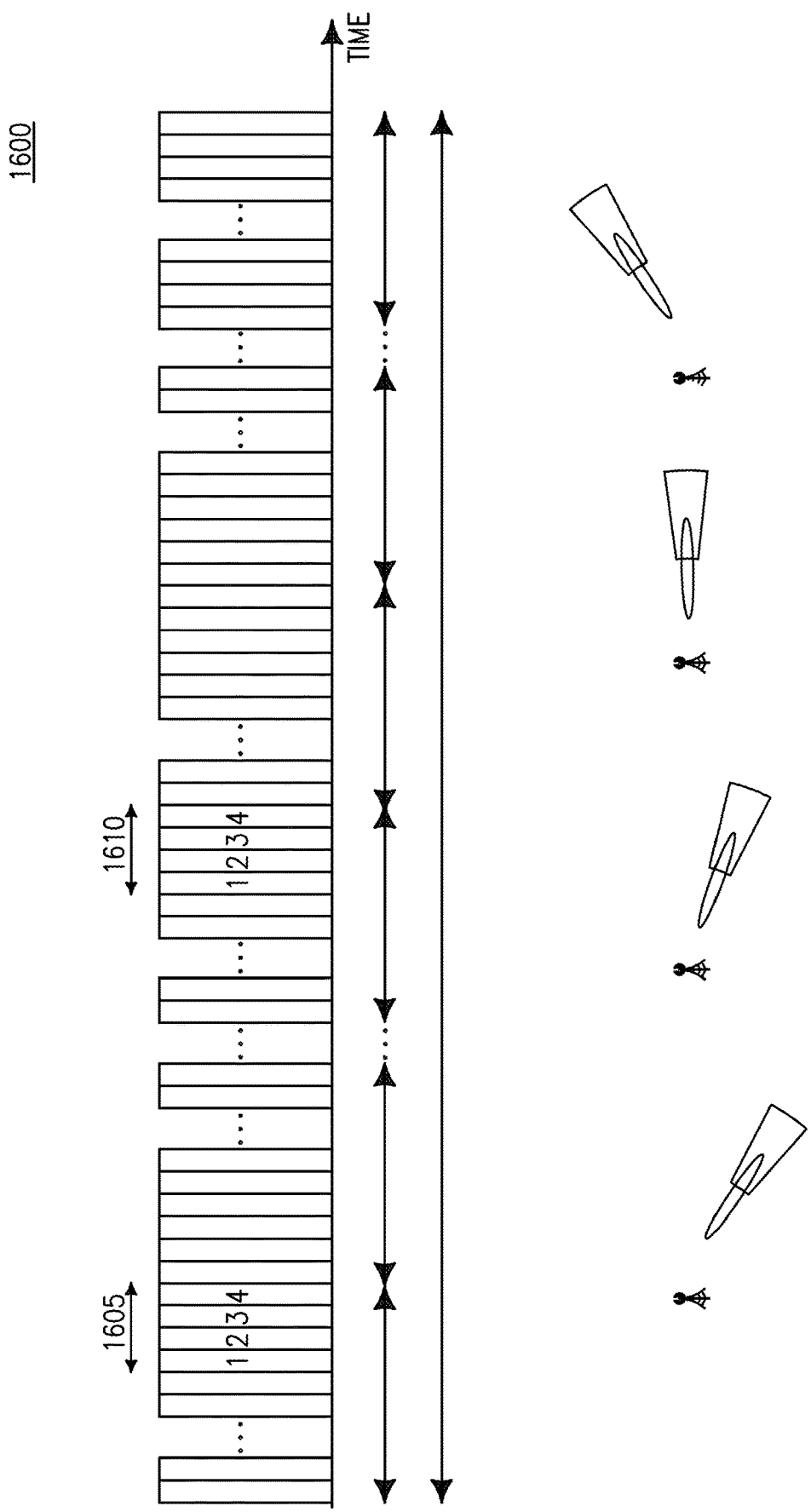
FIG. 16 is a diagram of an example mapping where the broadcast channel is associated with a synchronization signal type in a one-to-one mapping.

FIG. 16 is a diagram 1600 of an example mapping where the broadcast channel is associated with a synchronization signal type in a one-to-one mapping. In the example illustrated in FIG. 16, the synchronization signal type in the synchronization region 1605 and associated broadcast channel in the broadcast region 1610 are carried in the same eNB transmit beam. However, in embodiments, the synchronization types may be associated with broadcast beams in different transmit beams.

There may be a fixed beam-specific offset in terms of number of time resource units within the same beam between the broadcast channel and the associated synchronization signal. The offsets may be identical for each synchronization signal type and broadcast channel pair located in the same beam. The fixed offset may be different between synchronization signal type and broadcast channel when they are carried in different eNB transmit beams.

In embodiments, the beamformed broadcast channel may have a variable symbol location within a TTI, subframe or frame. In these scenarios, WTRUs may apply blind decoding to locate and decode the broadcast channel.

Figure 17:
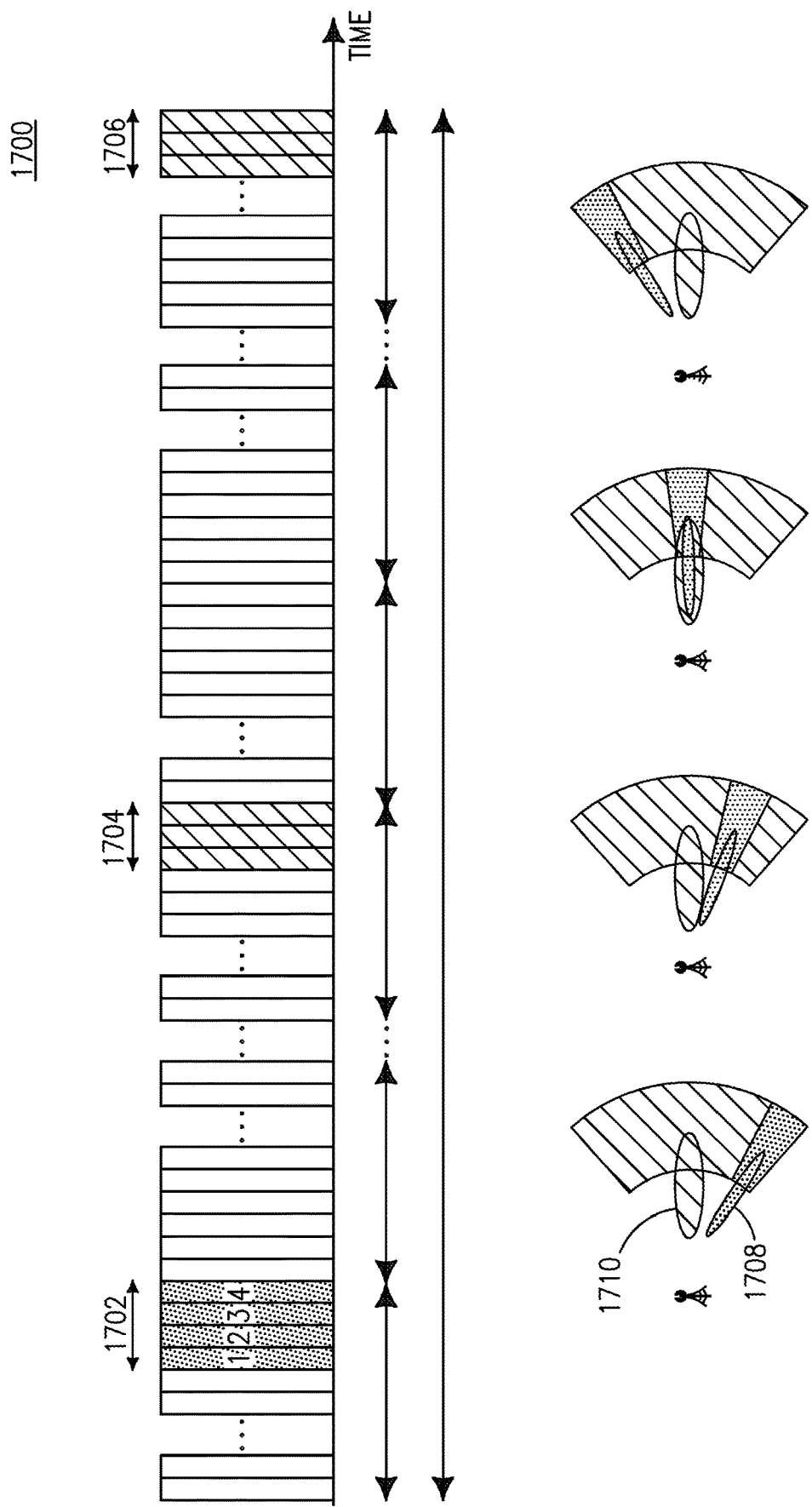
FIG. 17 is a diagram of an example mapping where the broadcast channel is associated with a synchronization signal type in a one-to-many mapping.

FIG. 17 is a diagram 1700 of an example mapping where the broadcast channel is associated with a synchronization signal type in a one-to-many mapping. In the example illustrated in FIG. 17, the broadcast channel may be carried in a cell-wide beam 1710 in broadcast region 1704, 1706 and may be linked to each synchronization signal type carried in a different eNB narrow transmit beam such as beam 1708 in synchronization region 1702. The symbol distance offset between the broadcast channel and each synchronization signal type may be different, and WTRUs may apply blind decoding to locate and decode the broadcast channel.

In embodiments, a WTRU may use a pre-defined set of values to determine a cell-wide beam broadcast channel location based on the detected synchronization signal location. The offset may indicate, for example, the symbol distance between the detected synchronization signal type and associated broadcast channel in the same wide or narrow eNB transmit beam or the symbol distance between the detected synchronization signal type and associated broadcast channel in a different wide or narrow eNB transmit beam. The offset may take into account that the periodicity and symbol locations of the broadcast channel in the cell-wide and narrow transmit beams may be different.

In embodiments, the offset values may be pre-defined or pre-configured or may be obtained by blind decoding. Additionally, the offset values may be indicated by one or a few properties of the associated synchronization signal types. The synchronization signal type, therefore, may have one or multiple properties that may indicate linkage information between the synchronization signal type and associated broadcast channel in order to locate and decode the broadcast channel. The properties may include the synchronization signal type sequence index, time resource allocation (such as symbol location, TTI number, subframe number and/or frame number), frequency resource allocation (such as radio bearer (RB) number) and spatial resource allocation (such as beam index). The linkage information may be based on this information and a pre-defined or pre-configured mapping or table.

The linkage between the synchronization signal type and associated beamformed broadcast channel may also include link adaptation information of the broadcast channel. For example, the linkage information may indicate the transport format of the broadcast channel such as the coding and modulation used and also the periodicity of the transmission. For example, a broadcast channel carried in a wide eNB transmit beam may apply a conservative transport format and a low transmission interval to ensure reliability of PBCH decoding. A broadcast channel associated with synchronization signal types in a narrow eNB transmit beam may use an aggressive transport format to carry more system information.

A beamformed broadcast channel may be multiplexed with a beam-specific and/or cell-specific reference signal used by WTRUs to de-modulate the broadcast channel. A reference signal with the same beamforming configuration as the broadcast channel may be located at a fixed offset in terms of number of time resource units (e.g., number of symbols from the linked synchronization signals).

The reference signal may be used to demodulate the beamformed broadcast channel. It may be a cell-specific reference signal and may be used by all beams carrying broadcast channels. The reference signal may be scrambled with a beam identity and may be transmitted using a beam-specific frequency or code resource determined by the beam index or identity.

A synchronization signal may provide information to determine the reference signal configuration for a WTRU to apply the reference signal to demodulate the broadcast channel data. The broadcast channel may use a pre-defined sequence mapping to select the used sequence based on one or a few properties of the associated synchronization signal types.

For example, there may be a table between the synchronization signal type sequence index and the associated broadcast channel reference signal sequence index. In another example, the broadcast channel reference signal sequence may be a function of the sequence index and/or the time or frequency resource allocation, such as the symbol location or RB number of the detected synchronization signal type. WTRUs may use the function to determine the broadcast channel reference signal configuration.

The PBCH may provide mapping information for BRS to the linked physical downlink control channel (PDCCH) beam. The same reference signal may be used for the PFICH and the PDCCH, and the PBCH may have information to indicate the PCFICH resource allocation size and PDCCH configuration per beam.

The WTRU may use different methods of initial cell search to detect the synchronization signals and decode the broadcast channel. In embodiments, hierarchical cell search may be used.

Figure 18:
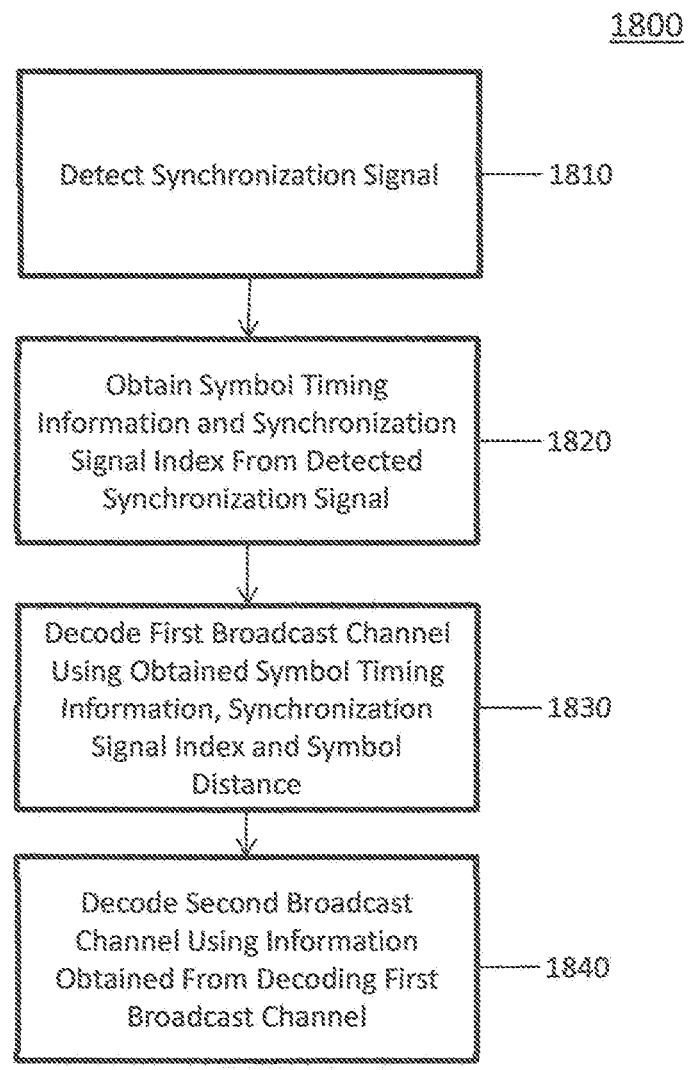
FIG. 18 is a flow diagram of an example method of initial cell search and selection using beamforming.

FIG. 18 is a flow diagram 1800 of an example method of initial cell search and selection using beamforming. In the example illustrated in FIG. 18, a WTRU detects a synchronization signal (1810). In an embodiment, this may be done by sweeping a respective one of a plurality of receive beams during each of a plurality of synchronization sub-frames, using a pre-defined sweep time and dwell period, to detect a synchronization signal. A WTRU may, for example, distinguish a synchronization signal type and its associated broadcast channel using a property of the detected signal. In the example illustrated in FIG. 18, the WTRU obtains symbol timing information and a synchronization signal index from the detected synchronization signal (1820). The WTRU may be configured with a set of synchronization signal indices, and the obtained synchronization signal index may correspond to a synchronization signal index in the set. The WTRU may decode a first broadcast channel using the obtained symbol timing information, the obtained synchronization signal index and a predefined or blind-decoded symbol distance between the detected synchronization signal and the first broadcast channel (1830). The WTRU may decode a second broadcast channel using information obtained from decoding the first broadcast channel (1840).

In embodiments, a specific set or subset of sequences may be used only for synchronization signals used in a wide beam to provide for wide coverage, and different sets of the sequences may be used for the synchronization signals used in narrow beams. In embodiments, the WTRU may detect different synchronization signal types based on the frequency resource or time resource allocation of the detected synchronization signal.

To detect the synchronization signal, a WTRU may apply a hierarchical cell search to sequentially search a set of synchronization signals with decreasing associated bandwidth. Each synchronization signal type may use a specific sequence and link with the next synchronization signal type. For example, a WTRU may identify the PSS based on its sequence ID and may use link information provided in the PSS to detect the SSS. A WTRU may apply a pre-defined accumulation scheme for each synchronization type, for example.

In embodiments, the WTRU may obtain a metric from the detected synchronization signal for each of the plurality of receive beams. The WTRU may identify one of the plurality of receive beams that has the best metric and obtain a sweep time and dwell period for the identified one of the plurality of receive beams. The WTRU may identify a set of receive beams within the identified one of the plurality of receive beams and sweep a respective one of the set of receive beams during each of a plurality of synchronization sub-frames using the obtained sweep and dwell period. The WTRU may detect a synchronization signal using the sweeping. This may be used with a staged mmW search procedure, such as is described below with respect to FIG. 19.

In embodiments, a WTRU may select a synchronization signal type that is above a pre-defined threshold and use the linkage information to decode the associated broadcast channel in the linked eNB transmit beam to acquire the cell access. A WTRU may use the beam scheduling and sweep information acquired in the selected eNB transmit beam and repeat the synchronization of other synchronization signal types in different eNB transmit beams to evaluate all available eNB transmit beams in the cell and may select another one for further cell access. The selection criteria may be a measured beam-specific reference signal quality metric.

In embodiments, WTRUs may receive a synchronization signal type reconfiguration signaled in a system information broadcast or dedicated signaling intended for beam selection/reselection and measurement. The configuration may include information associated with a plurality of downlink directional beams, and the information may include at least synchronization signal types associated with each of the plurality of downlink directional beams and a configuration of each synchronization signal type. The configuration may include, for example, the size of the unique word used in the associated eNB directional beam, the type of the unique word used in the associated eNB directional beam, and the index and identity of the unique word used in the associated eNB directional beam.

A WTRU may sweep the receive beam and detect the synchronization signal types, each of which may be associated with an eNB downlink directional beam, as mentioned above. The WTRU may select a detected eNB downlink directional beam for synchronization and reception according to a pre-configured criteria, such as WTRU service type, WTRU capability, and/or synchronization signal type. The WTRU may synchronize with the selected synchronization signal type within its associated eNB downlink directional beam and receive communication within the selected eNB downlink directional beam.

In embodiments, a WTRU may synchronize with a cell using one synchronization signal type and decode the cell broadcast channel and establish symbol, TTI, sub-frame and SFN timing. In embodiments, the WTRU may detect the presence of one synchronization signal type (e.g., PSS) in a time window by correlating one or multiple pre-defined sequences specific for the sought synchronization type. The sequences may have pre-defined properties that may indicate one or more of the symbol distance between the synchronization signal type and another synchronization signal type, the symbol distance between the synchronization signal and the broadcast channel, TTI number and cell identity and/or beam identity information, the broadcast channel demodulation reference signal sequence, presence of the broadcast channel mapped to the same synchronization signal type eNB transmit beam and associated broadcast channel transport format.

The WTRU may acquire the symbol timing, for example, at the highest peak per sequence (e.g., synchronization signal type), which may exceed a pre-defined threshold. The WTRU may select a synchronization signal type according to pre-defined and/or pre-configured rules, such as a preference for synchronization signal types carried in a cell-wide eNB transmit beam to reduce the latency of the broadcast channel decoding, preference for synchronization signal types carried in a highly beamformed transmit beam to improve the decoding performance of the broadcast channel coding, and preference for synchronization signal types based on the WTRU service type, traffic type and WTRU capability.

The WTRU may establish reference symbol timing start based on the detected and selected synchronization signal type. The WTRU may decode the broadcast channel using the linkage information derived from the detected synchronization signal type, such as the symbol distance offset, broadcast channel reference sequence index and broadcast channel transport format. The WTRU may acquire broadcast channel content of MIB or pre-MIB, including all cell, beam, timing, control channel and other information, such as offset to TTI start (e.g., symbol number, SFN, or eNB transmit beam identity), number of supported eNB transmit beams, and other beam-specific and/or cell-specific configuration. When receiving pre-MIB, the WTRU may use the linkage information to decode the next broadcast channel and acquire the cell system information.

In embodiments, the WTRU may locate the control channel beam using the broadcast information and may acquire the control channel. A WTRU may sweep receive beams and search one or multiple synchronization signal types using their predefined configuration. The sought synchronization signal types may be determined by service type, WTRU category and capability. The WTRU may acquire time resource unit timing, such as symbol timing, from one synchronization signal type and linkage information to another synchronization signal type. The WTRU may detect another synchronization signal to acquire TTI timing, subframe timing and/or frame timing and use the linkage between the synchronization signal and its associated broadcast channel to locate the broadcast channel to read beam-specific information, including, for example, beam identity, number of beams, sweep schedule and other system information. The WTRU may then locate a control channel beam using the broadcast information and may acquire the control channel and read system information.

Regarding WTRU rotation, to better illustrate the importance of considering rotational motion over translational motion, a brief derivation of their relationship in the context of aligning WTRU and eNB beams is described. For sake of simplicity, a 2D example is considered, where the eNB and WTRU are beam aligned on the x-axis and separated by a distance d. Assuming the WTRU moves in the positive y direction with a speed of v(t) km/h, the following may be true:

$$\tan(\theta(t)) = \frac{y(t)}{d} \quad (1)$$

In equation (1), θ may be the LOS angle between the eNB and the WTRU, and y(t) may be the vertical distance at time t. Using the method of implicit differentiation on (1) gives the following:

$$\left(\frac{d\theta(t)}{dt}\right)\sec^2(\theta(t)) = \frac{1}{d}\left(\frac{dy(t)}{dt}\right) \quad (2)$$

which may be arranged to obtain the linear speed, $$v(t) = \frac{dy(t)}{dt},$$

as a function of the angular speed $$\omega(t) = \frac{d\theta(t)}{dt}.$$

$$v(t) = d\omega(t)\sec^2(\theta(t)) \quad (3)$$

From (3), it can be seen that, in order to maintain a constant angular speed, the linear speed must continually increase. Furthermore, the rate of the increase also increases both with the angle, θ and the distance, d. It was discovered via experimentation that rotation speeds for orientation changes (e.g., flipping a phone up from a table for viewing) are in the range of 45° to 360° per second. This range is in line with other independent investigations, which go further to provide estimates of rotational speeds up to 800° per second for gaming uses. Assuming d=25 m, and using a modest angular speed of 45° per second, the equivalent linear speed may be approximately 70 and 140 km/h for instantaneous angles of 0° to 45°, respectively. This simple example makes clear that rotational motion in mmW communication may have a much greater impact than translational motion for maintaining beam alignment.

Figure 19:
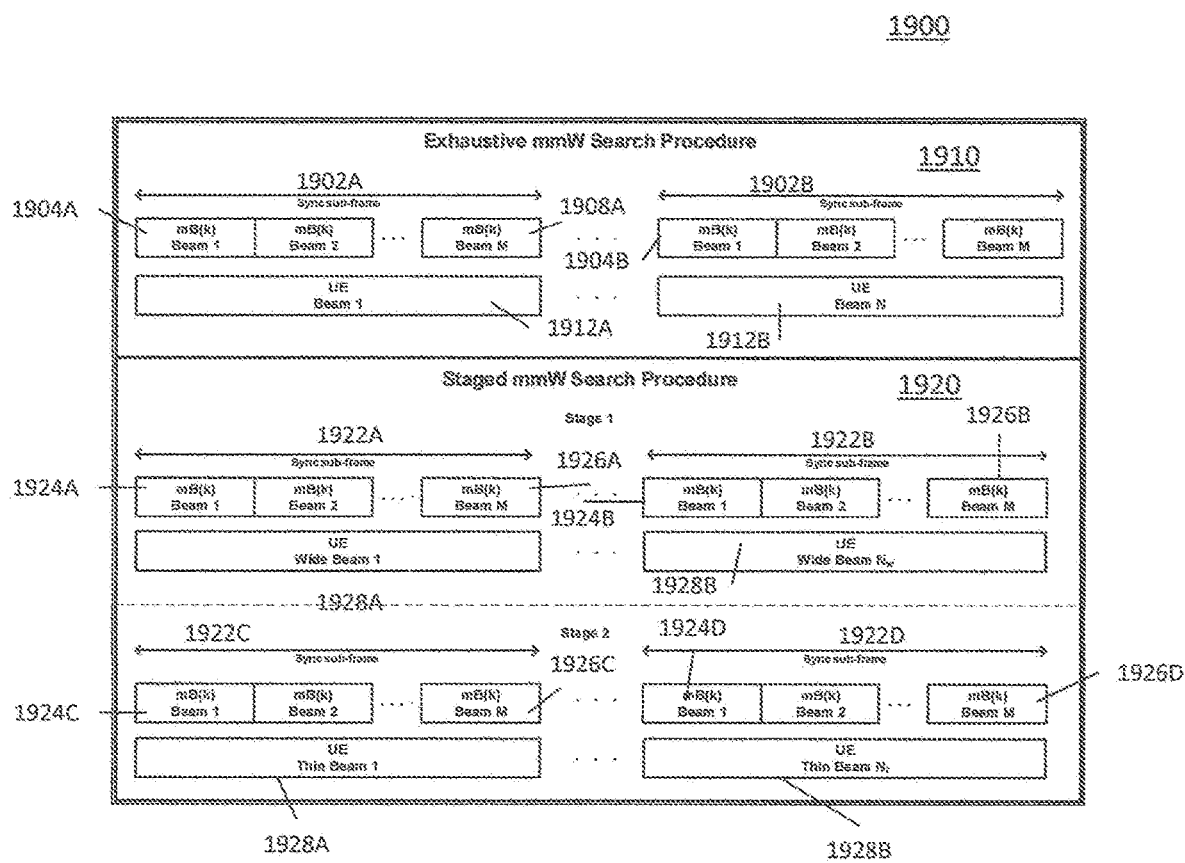
FIG. 19 is a diagram showing examples of an exhaustive search and a staged search.

Two main algorithms were studied for purposes of maximizing a function that represents the link quality as a function of the beam pair for each of K cells: an exhaustive search and a staged search. FIG. 19 is a diagram 1900 showing examples of an exhaustive search and a staged search.

An example exhaustive search procedure is illustrated at 1910 in FIG. 19. In the example 1910 illustrated in FIG. 19, a WTRU may search over all eNB transmit beams 1904-1908 from all cells by sweeping one of N receive beams 1912 during each synchronization subframe 1902. The total search time will, therefore, be N frames (assuming one synchronization subframe per downlink frame). At the end of the search, the following maximization may be evaluated:

$$\hat{k}, \hat{m}, \hat{n} = \underset{k,m,n}{\operatorname{argmax}}\{f(k, m, n)\} \quad (4)$$

In equation (4), k, m, and n are the cell index, cell beam index, and WTRU beam index, respectively, $\hat{k}$, $\hat{m}$, and $\hat{n}$ are the corresponding chosen indices, and f(.) is the objective function representing the quality of the received synchronization signal. For purposes simulation, the objective function will be a signal to interference plus noise ratio (SINR) measurement.

An example staged procedure is illustrated at 1920 in FIG. 19. In the example illustrated in FIG. 19, a WTRU is defined to have $N_w$ wide beams 1928 and may have the capability to generate Nt thinner beams 1928 within each of the $N_w$ wide beams 1912. The total number of WTRU receive beams is still N, which may be defined as $N=N_w N_t$.

A staged procedure may begin with a WTRU searching over all M transmit beams 1924-1926 by sweeping one of the $N_w$ receive beams 1928 during each synchronization subframe 1922. At the end of the first search stage, the following maximization may be evaluated:

$$\hat{k}, \hat{m}, \widehat{n_w} = \underset{k,m,n_w}{\operatorname{argmax}}\{f(k, m, n_w)\} \quad (5)$$

In equation (5), k, m and $n_w$ are the cell index, cell beam index and WTRU wide beam index, respectively, and $\hat{k}$, $\hat{m}$ and $\hat{n}$ are the corresponding chosen cell beam indices. Although $\hat{m}$ is the chosen cell beam index, the second stage will repeat the search over all M beams for the chosen cell.

In the second stage, since the WTRU has already identified the cell index, $\hat{k}$, and a WTRU wide beam index, $\widehat{n_w}$, a reduced search may take place using only $$N_t = \frac{N}{N_w}$$

receive beams 1928 to search over the M transmit beams 1924-1926 during each synchronization subframe 1922. At the end of the second stage, another maximization may be evaluated:

$$\hat{m}, \widehat{n_t} = \underset{m,n_t}{\operatorname{argmax}}\{f(m, n_t)\} \quad (6)$$

In equation (6), $n_t$ is the second stage WTRU thin beam index, m is the cell beam index, $\widehat{n_t}$ is the chosen WTRU array beam index and $\hat{m}$ is the chosen cell beam index. Using the same synchronization subframe periodicity as in the exhaustive procedure, the total search time for this approach is then $$\left(N_w + \frac{N}{N_w}\right)$$

frames.

Both the exhaustive and staged search procedures may assume that one observation per beam pair is made before the maximization. Time diversity, in the form of averaging multiple observations over time, is sometimes used in LTE-based cell search to combat fast fading. However, because of the presumed higher sensitivity to WTRU rotational motion, the studies described herein use single observation methods only.

The impact of WTRU rotational motion using both the exhaustive and staged searching procedures was analyzed using a custom Matlab based system simulation environment wherein WTRUs experience both translational and rotational motion based on custom models. Overall parameters for the simulations are provided in

TABLE 3

| Parameter | Values(s)/Description |
|---|---|
| AWE WinProp Ray Fracing Parameters | |
| Environment | METIS Madrid |
| Building Material-Concrete | Relative Permittivity: 6
Relative Permeability: 1
Conductivity: 1 S/m |
| Vehicle Material-Metallic | Relative Permittivity: 1
Relative Permeability: 20
Conductivity: 1000 S/m
Cars: 5.0 × 2 × 1.5 m rectangular prism
Trucks: 14 × 2 × 3.7 m rectangular prism
SUVs: 5.3 × 2.1 × 2 m rectangular prism |
| Human Blockers | Relative Permittivity: 24
Relative Permeability: 1
Conductivity: 10 S/m |
| Vegetation/Trees | Penetration Loss: 3.21 dB/m |
| Grid Resolution | 3 m |
| mB/UE Height | 5/1.5 m |
| Frequency | $F_c = 28$ GHz |
| mB Tx Power | 40 dBm EIRP |
| mB Density | 45 mB/km$^2$ |
| Antenna Configuration Parameters | |
| mB 3 dB Beam Widths | 15°, 6 beams per array |
| WTRU 3 dB Beam Widths | [15°, 8°], [6, 12] beams per array |
| System Simulation Parameters | |
| Bandwidth | B = 500 MHz |
| Noise Power per Hz | −174 dBm/Hz |
| WTRU Density | 5000 WTRU's/km$^2$ |
| Number of Drops | 25 |
| Initial Device Orientation | In the horizontal plane with a uniformly random rotation around the z-axis. |
| WTRU Translation Motion [km/hr] | Each WTRU is assigned a speed from a uniform distribution with values between [3-30] as well as a direction from one of the four cardinal directions. |
| UE Rotation Motion [deg/sec] | Values vary between [0-800], and are based on the test case being run. |

Figure 20:
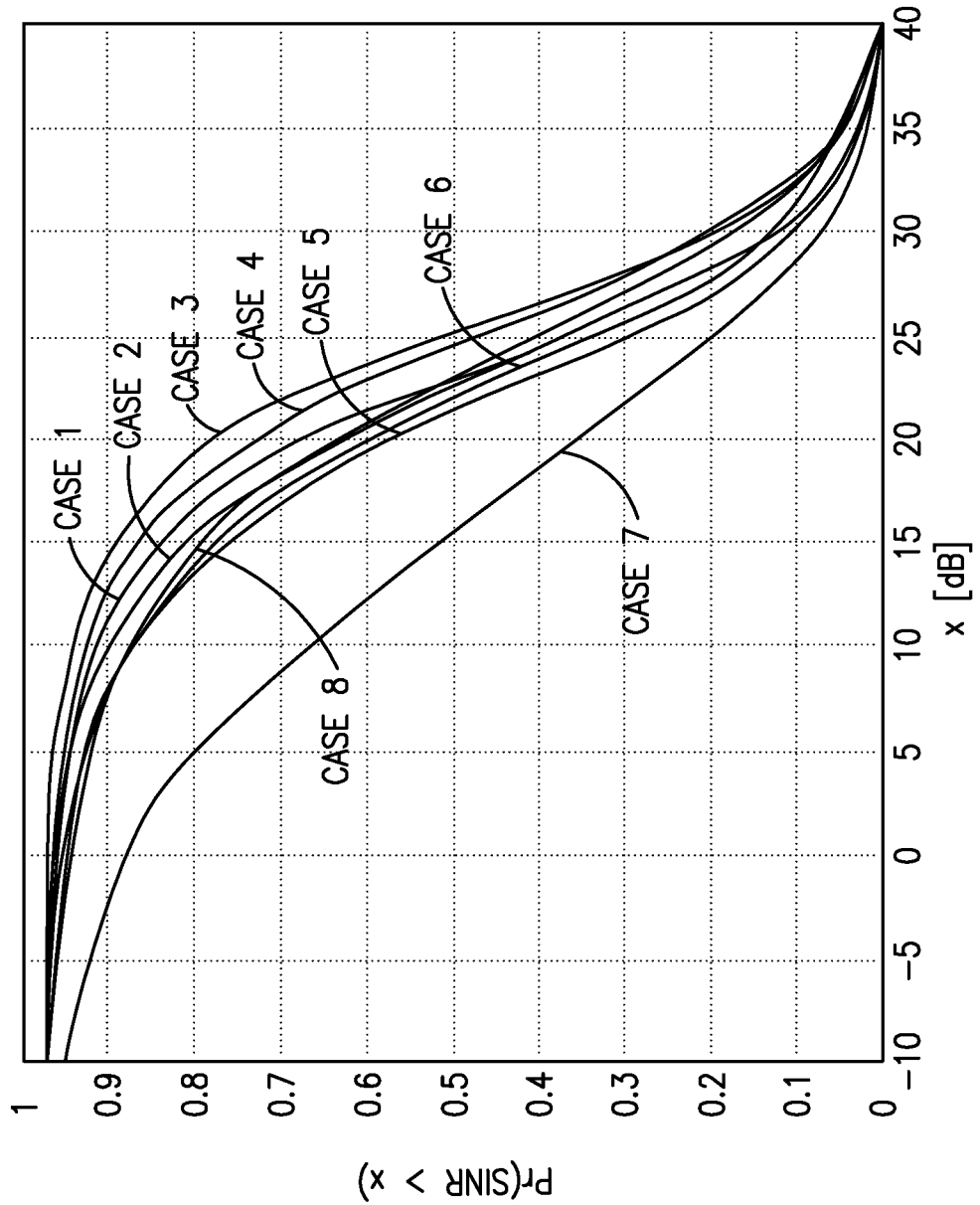
FIG. 20 is a graph showing results of a first set of simulations studying impact of rotation using exhaustive and staged search procedures.

The simulation results highlight the performance difference between the exhaustive and staged procedures as well as the impacts from WTRU motion. A first set of simulations were performed for rotating and non-rotating WTRUs to highlight the impact of rotational motion. The test case specific simulation parameters are listed in Table 4, and the results are shown in the graph 2000 in FIG. 20. The simulations assume one wide beam per array.

TABLE 4

| Test Number | # WTRU Beams per Array | Procedure Type | Procedure Time [# of TTIs] | WTRU Rotation Speed [deg/sec] |
|---|---|---|---|---|
| 1 | 6 | Exhaustive | 240 | 0 |
| 2 | 6 | Staged | 100 | 0 |
| 3 | 12 | Exhaustive | 480 | 0 |
| 4 | 12 | Staged | 160 | 0 |
| 5 | 6 | Exhaustive | 240 | 360 |
| 6 | 6 | Staged | 100 | 360 |
| 7 | 12 | Exhaustive | 480 | 360 |
| 8 | 12 | Staged | 160 | 360 |

Table 5 shows the mean SINR differences between the exhaustive and staged procedures both with and without WTRU rotation. The first two columns indicate that when there is no rotation, the staged approach may be preferable since it results in less processing time and energy consumption and further shows negligible performance differences. The staged approach is a non-exhaustive approach, which classically comes at the cost of some amount of performance degradation. In this case, however, the methodology used results in mostly identical beams being chosen for both procedures. Hence, there is minimal performance impact. The second two columns, which represent cases where the WTRU is under rotational motion, go even further to show that there is even a gain incurred by using the non-exhaustive search procedure. This may be attributed to the fact that the SINRs measured during the procedure when the device is being rotated may become stale by the end of the procedure when the maximization is evaluated. This further points to a potential advantage to using a staged approach for mmW systems.

TABLE 5

| | # WTRU Beams per Array | | | |
|---|---|---|---|---|
| | 6 | 12 | 6 | 12 |
| WTRU Rotation Speed [deg/sec] | 0 | 0 | 360 | 360 |
| Mean SINR Delta [dB] | 0.37 | 0.58 | −1.32 | −7.2 |

Table 6 shows the mean SINR differences between non-rotating and rotating WTRUs and shows that, for both WTRU beam widths, the performance is more severely impacted by rotation in the exhaustive search compared with the staged search. This may highlight the fact that impact from rotation is more directly tied to the required procedure processing time relative to the WTRU rotational speed.

TABLE 6

| | # WTRU Beams per Array | | | |
|---|---|---|---|---|
| | 6 | 12 | 6 | 12 |
| Procedure | Exhaustive | Exhaustive | Staged | Staged |
| Mean SINR [dB] | 1.9 | 9.75 | 0.21 | 2.0 |

Figure 21:
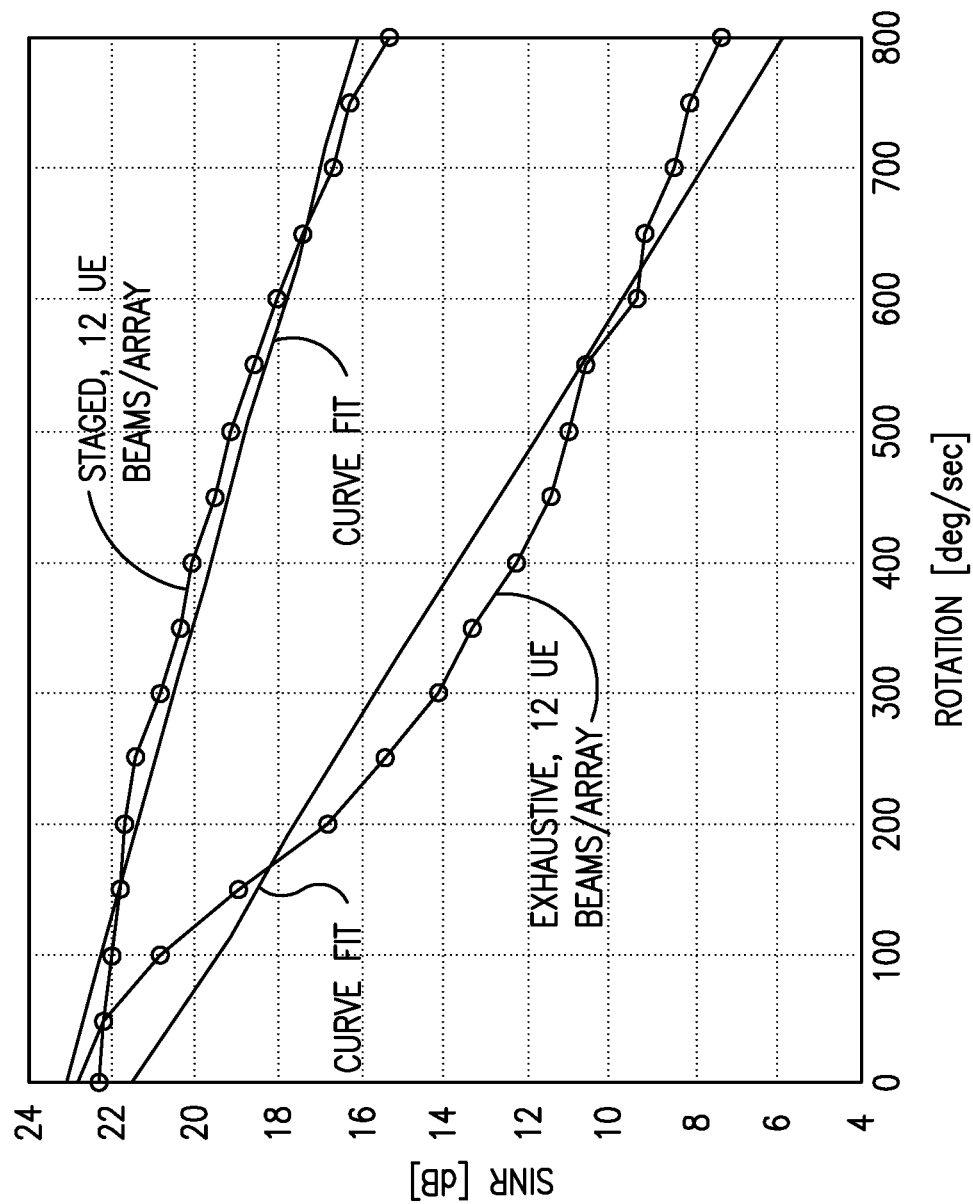
FIG. 21 is a graph showing results of a second set of simulations studying the performance of the exhaustive and staged search procedures as a function of rotation speed.

The first set of simulations highlights the need to consider WTRU rotation when designing system procedures for a mmW system. A second set of simulations was performed to explicitly show the performance as a function of the rotational speed. The exhaustive and staged procedures were simulated, both using WTRUs with 12 beams per array. Each of these two configurations was tested for rotation speeds from 0° to 800° per second. The mean SINR was subtracted from each test and plotted as shown in the graph 2100 in FIG. 21. The SINR loss per degree/sec of rotation was extracted by fitting a line to the two curves and was found to be 1 dB per 100°/sec and ~2 dB per 100°/sec for the staged and exhaustive procedures respectively.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
an antenna;
a transceiver, operatively coupled to the antenna; and
a processor, operatively coupled to the transceiver;
the antenna, the transceiver, and the processor configured to receive a configuration message including timing information for monitoring one or more subsets of a plurality of beams to receive a set of synchronization signals;
the antenna and the transceiver configured to receive the set of synchronization signals based on the timing information, wherein the received set of synchronization signals includes a primary synchronization signal and a secondary synchronization signal;
the antenna, the transceiver, and the processor configured to receive a reference signal along with a physical broadcast channel (PBCH) transmission, wherein the reference signal comprises a sequence that is derived from an index associated with one subset of the one or more subsets of the plurality of beams and associated with the received set of synchronization signals; and
the antenna and the transceiver configured to transmit a random access channel (RACH) transmission, wherein the RACH transmission includes a preamble sequence corresponding to the one subset of the one or more subsets of the plurality of beams.

2. The WTRU of claim 1, the antenna, the transceiver, and the processor are configured to receive configuration information indicating one or more RACH resource sets, each of the one or more RACH resource sets being linked to at least one of the plurality of beams.

3. The WTRU of claim 2, wherein each of the one or more RACH resource sets defines a plurality of RACH transmission opportunities.

4. The WTRU of claim 2, wherein the configuration information indicating the one or more RACH resource sets is received in a system information block transmission.

5. The WTRU of claim 2, wherein the RACH transmission is transmitted in a RACH transmission opportunity associated with one of the RACH resource sets.

6. The WTRU of claim 1, wherein the reference signal is offset from the primary synchronization signal by a fixed number of symbols.

7. The WTRU of claim 1, wherein the antenna, the transceiver, and the processor are configured to receive information indicating criteria to be used for selecting the set of synchronization signals from a plurality of received sets of synchronization signals.

8. The WTRU of claim 1, wherein the configuration message includes information indicating a periodicity associated with the set of synchronization signals.

9. The WTRU of claim 8, wherein the set of synchronization signals is received at least twice within a time duration provided by the periodicity.

10. The WTRU station of claim 1, wherein the PBCH transmission provides system timing information, a beam-specific reference sequence, and a beam-specific resource allocation associated with another PBCH transmission and wherein the system timing information indicates at least a beam sweep time and a dwell period of a transmission of the another PBCH transmission.

11. A method performed by a wireless transmit/receive unit (WTRU), the method comprising:
- receiving a configuration message including timing information for monitoring one or more subsets of a plurality of beams to receive a set of synchronization signals;
- receiving the set of synchronization signals based on the timing information, wherein the received set of synchronization signals includes a primary synchronization signal and a secondary synchronization signal;
- receiving a reference signal along with a physical broadcast channel (PBCH) transmission, wherein the reference signal comprises a sequence that is derived from an index associated with one subset of the one or more subsets of the plurality of beams and associated with the received set of synchronization signals; and
- transmitting a random access channel (RACH) transmission, wherein the RACH transmission includes a preamble sequence corresponding to the one subset of the one or more subsets of the plurality of beams.

12. The method of claim 11, further comprising receiving configuration information indicating one or more RACH resource sets, each of the one or more RACH resource sets being linked to at least one of the plurality of beams.

13. The method of claim 12, wherein each of the one or more RACH resource sets defines a plurality of RACH transmission opportunities.

14. The method of claim 12, wherein the configuration information indicating the one or more RACH resource sets is received in a system information block transmission.

15. The method of claim 12, wherein the RACH transmission is transmitted in a RACH transmission opportunity associated with one of the RACH resource sets.

16. The method of claim 11, wherein the reference signal is offset from the primary synchronization signal by a fixed number of symbols.

17. The method of claim 11, further comprising receiving information indicating criteria to be used for selecting the set of synchronization signals from a plurality of received sets of synchronization signals.

18. The method of claim 11, wherein the configuration message includes information indicating a periodicity associated with the set of synchronization signals.

19. The method of claim 18, wherein the set of synchronization signals is received at least twice within a time duration provided by the periodicity.

20. The method of claim 11, wherein the PBCH transmission provides system timing information, a beam-specific reference sequence, and a beam-specific resource allocation associated with another PBCH transmission and wherein the system timing information indicates at least a beam sweep time and a dwell period of a transmission of the another PBCH transmission.

* * * * *